US011927040B2

(12) United States Patent
Lee

(10) Patent No.: US 11,927,040 B2
(45) Date of Patent: Mar. 12, 2024

(54) APPARATUS FOR GUIDING ROTATION OF GEAR HINGE PART IN ROTARY DOOR

(71) Applicant: FILOBE CO., LTD., Gyeongsan-si (KR)

(72) Inventor: Kwang-Seog Lee, Daegu (KR)

(73) Assignee: FILOBE CO., LTD., Daegu South (KR)

( * ) Notice: Subject to any disclaimer, the term of this patent is extended or adjusted under 35 U.S.C. 154(b) by 187 days.

(21) Appl. No.: 17/635,989

(22) PCT Filed: Aug. 18, 2020

(86) PCT No.: PCT/KR2020/010946
§ 371 (c)(1),
(2) Date: Apr. 21, 2022

(87) PCT Pub. No.: WO2021/034067
PCT Pub. Date: Feb. 25, 2021

(65) Prior Publication Data

US 2022/0275673 A1 Sep. 1, 2022

(30) Foreign Application Priority Data

Aug. 20, 2019 (KR) ........................ 10-2019-0101986

(51) Int. Cl.
*E05D 11/00* (2006.01)
*E05D 1/00* (2006.01)
*E05D 7/00* (2006.01)

(52) U.S. Cl.
CPC ................ *E05D 11/00* (2013.01); *E05D 1/00* (2013.01); *E05D 7/009* (2013.01); *E05D 11/0054* (2013.01); *E05Y 2201/71* (2013.01); *E05Y 2600/45* (2013.01); *E05Y 2600/46* (2013.01); *E05Y 2800/27* (2013.01);
(Continued)

(58) Field of Classification Search
CPC ........ E05D 1/00; E05D 11/00; E05D 11/0054
See application file for complete search history.

(56) References Cited

U.S. PATENT DOCUMENTS 10,337,224 B1 * 7/2019 Shah .................. E05D 11/1078
11,459,809 B1 * 10/2022 Hsu ......................... E05D 3/122
2017/0152690 A1 * 6/2017 Knoechel ................. E05D 5/06
(Continued)

*Primary Examiner* — Jason W San
(74) *Attorney, Agent, or Firm* — Neifeld IP Law PLLC

(57) ABSTRACT

The present invention relates to a device capable of guiding a stable rotational actuation between a first support bracket fixedly connected to a supporting frame side of a door frame and a second support bracket fixedly connected to the door side in a gear hinge unit constituting a rotating door, specifically, in a door hinge in which a gear hinge unit is provided between the first support bracket fixedly connected to the support frame side of the door frame and the second support bracket fixedly connected to the door side, by minimizing the compressive stress generated in the lower gear hinge unit under a neutral axis of the door and the tensile stress generated in the upper gear hinge unit above the neutral axis of the door by the rotational moment applied to the gear hinge unit due to the load of the door, it is possible not only to secure and maintain the correct opening/closing performance of the door, but also to minimize damage to parts caused by friction or friction noise in the door hinge.

7 Claims, 25 Drawing Sheets

(52) U.S. Cl.
CPC ... *E05Y 2800/406* (2013.01); *E05Y 2800/412* (2013.01); *E05Y 2800/422* (2013.01); *E05Y 2900/132* (2013.01)

(56) References Cited

U.S. PATENT DOCUMENTS

| | | | | |
|---|---|---|---|---|
| 2017/0306671 | A1* | 10/2017 | Lee | E05D 11/06 |
| 2020/0064890 | A1* | 2/2020 | Siddiqui | G06F 1/1681 |
| 2020/0293094 | A1* | 9/2020 | Liu | G06F 1/1652 |
| 2020/0363843 | A1* | 11/2020 | Cheng | H04M 1/02 |
| 2022/0120122 | A1* | 4/2022 | Lee | E05D 15/165 |
| 2022/0341251 | A1* | 10/2022 | Lee | E06B 7/2305 |
| 2023/0021638 | A1* | 1/2023 | Yun | F16C 11/04 |

* cited by examiner

[Upper Section line a-a'] / Open

[Lower Section line a-a'] / Open

APPARATUS FOR GUIDING ROTATION OF GEAR HINGE PART IN ROTARY DOOR

FIELD OF THE INVENTION

The present invention relates to an apparatus capable of guiding a (relatively) stable rotational actuation between a first support bracket fixedly connected to a supporting frame side of a door frame and a second support bracket fixedly connected to a door side in a gear hinge part (hereinafter referred to as a gear hinge unit) constituting a rotary door (hereinafter referred to as a rotating (hinged) door). More specifically, in a door hinge in which a gear hinge unit is provided between the first support bracket fixedly connected to the supporting frame side of the door frame and the second support bracket fixedly connected to the door side, by minimizing a compressive stress generated in a lower gear hinge unit under a neutral axis of the door and a tensile stress generated in a upper gear hinge unit above the neutral axis of the door induced by a rotational moment applied to the gear hinge unit through the second support bracket due to a load of the door, the present invention relates to a rotational actuation guide device of the gear hinge unit of the rotary door not only for ensuring and maintaining accurate opening and closing performance of the door, but also for minimizing damage to parts caused by friction or friction noise in the door hinge.

BACKGROUND ART

In general, in a rotary door, one side of a door is fixedly installed in a supporting frame of a door frame in which the door is installed, and a door hinge part having a rotating shaft is installed between this installation surfaces in one side of a door and one side of the supporting frame of the door frame, in order to enable horizontal rotation of the door, so that the door can be opened and closed.

Products having various shapes and structures of the door hinge part have been developed and used. In the case of using a general hinge part having a pin-type binge rod, which is most commonly used, if deformation does not occur in a hinge frame supporting the hinge rod, and if rigidity of a fixing means for fixing and connecting the hinge frame to the door or to the supporting frame of the door frame is sufficient, a vertical displacement by a vertical load of the door generally does not occur significantly. In this case, there is a problem in that it is difficult to enlarge the door, so when the door is enlarged, size and rigidity of the hinge part and size and rigidity of its fixing means (anchor) must also be increased, because rigidity to resist the rotational moment on the vertical plane occurring between the top and bottom of the door is weak. Furthermore, a demand that the cross-sectional size of the door (or the cross-sectional size of the door frame supporting the glass window constituting the door) should be minimized to meet the demand of consumers who want to slim it while increasing the size of the door, is conflict to a demand to increase the size of the fixing means (anchor). Therefore, there is a technical limitation that it is difficult to find a solution that satisfies all such conflicting demands (needs).

As a structure different from the general hinge part using such a pin-type hinge rod, a gear hinge unit shown in the accompanying drawings FIGS. 1 to 12 has been developed and used as a structure that can minimize a rotational moment occurring between a top and bottom of the door on the vertical surface of the door n accordance with the tendency of the door to be enlarged.

Hereinafter, in order to help the understanding of the present invention, a detailed configuration of such a gear hinge unit and an example of use of a rotary door using the same will be first described by using drawings of FIGS. 1 to 12. Reference may be made to the contents of KR (South Korea) Patent Publication No. 10-1,489,246 B1 and PCT Publication No. WO2016/043355.

In a rotary door 100U shown in FIGS. 1 to 3, a first support bracket 31 constituting a gear hinge unit 30 is attached to a vertical frame on one side of a door supporting frame 10 of a door frame by a screw 30*a*. A second support bracket 32 constituting the gear hinge unit 30 is fixedly connected to one side of a door 20 by a screw 30*a*, and a gear portions 31*a* and 32*a* respectively formed in the longitudinal direction are provided on opposite surfaces of the first support bracket 31 and the second support bracket 32 to engage with each other. Between the first support bracket 31 and the second support bracket 32, a rotation supporting frame 33 (see FIG. 3) for supporting the gear portions 31*a* and 32*a* from a rear direction is provided for the first support bracket 31 and the second support bracket 32 to enable rotating with being folded each other while positions of meshing gear teeth continue to change during that the gear portions 31*a* and 32*a* of the first support bracket 31 and the second support bracket 32 maintain their meshing state with each other.

On the other hand, the gear hinge unit 30 has a planar rotation structure that provides smooth rotation action and high resistance to rotation moment as shown in FIGS. 4 to 7. As shown in FIG. 4, a rotation shaft support pockets 31*b* and 32*b* are provided at one end of the first support bracket 31 and the second support bracket 32 i.e. on opposite sides of the gear portions 31*a* and 32*a* that engage with each other, and a hinge shaft protrusion 33*a* provided by being bent from both ends of the rotation supporting frame 33 is rotatably fitted into the rotation shaft support pockets 31*b* and 32*b*. Therefore, as shown in FIGS. 5 and 6, each of the first support bracket 31 and the second support bracket 32 rotates around the hinge shaft protrusions 33*a* of both ends of the rotation supporting frame 33 as a rotation axis. For example, if the first support bracket 31 is fixed to the door supporting frame 10 of the door frame and the second support bracket 32 is fixed to the door 20, as shown in FIGS. 5 to 7, the second support bracket 32 can be rotated relative to the fixed first support bracket 31.

Here, as shown in FIG. 7, a limit of an axial rotation of the second support bracket 32 is determined by a structure in which excessive rotation is blocked by an outer corners bent at both ends of the rotation supporting frame 33 being accommodated inside the rotation shaft support pockets 31*b* and 32*b* formed on the outer surfaces of the first support bracket 31 and the second support bracket 32 rotating outwardly.

In the case of the structure shown in the drawings of FIGS. 4 to 7, a structure in which the second support bracket 32 can be rotated by about 180 degrees with respect to the first support bracket 31 is exemplified.

As shown in FIG. 8, since the rotation supporting frame 33 supporting the meshing rotation of the gear portions 31*a* and 32*a* formed in a longitudinal direction on both sides of the first support bracket 31 and the second support bracket 32 that are rotated and folded in this way, and the rotation supporting frame 33 supporting the meshing rotation of the gear portions 31*a* and 32*a*, provides a structure in which the teeth of the gear formed elongated in the longitudinal direction are meshed with each other while providing smooth rotation between the first support bracket 31 and the second support bracket 32 on a horizontal plane, even if the door 20 is enlarged and the rotational moment generated between a top and a bottom of the door on a vertical surface of the door increases, it can sufficiently counteract the increased rotational moment. Therefore, it provides structural stability that can minimize a possibility of distortion in an installation direction or a position of the door.

On the other hand, in the first support bracket 31 and the second support bracket 32 rotate in a state of being engaged with each other by the gear portions 31*a* and 32*a* formed in the longitudinal direction on both sides, as shown in FIG. 9, since the second support bracket 32 fixedly connected to the door 20 has a cross-sectional structure that can be displaced in the longitudinal direction with respect to the first support bracket 31 fixedly connected to the supporting frame 10 of the door frame, in order to prevent such displacement, as shown in FIGS. 10 and 11, openings 31*c* and 32*c* facing each other are formed in the first support bracket 31 and the second support bracket 32, respectively, and then a vertical locking means 34 is commonly inserted into the opposing openings 31*c* and 32*c* as shown in FIGS. 10 and 11, and further, the vertical locking means 34 is fixed to an inner surface of the rotation supporting frame 33 through a fastening means 35, therefore one end of the vertical engaging means 34 is received while conforming to the inner space of the rotation supporting frame 33 integrally to form the gear hinge unit 30.

An upper surface and a lower surface of the vertical locking hole 34 provided to suppress a longitudinal displacement occurring between the first support bracket 31 and the second support bracket 32 are provided to support an end face in which the opposing openings 31*c* and 32*c* are formed at the gear portions 31*a* and 32*a* on both sides of the first support bracket 31 and the second support bracket 32 when the door is rotated to open and close while rubbing against the end face. Therefore, unlike the first support bracket 31 and the second support bracket 32 that are generally made of a metal material such as an aluminum alloy material, the vertical locking hole 34 is made of a synthetic resin material having a low coefficient of friction to prevent friction noise.

However, in an actual situation in Which a large scale door 20 is installed and used in the supporting frame 10 of the door frame through the gear hinge unit 30 described so far, as shown in FIG. 12, the downward displacement induced to the second support bracket 32 fixedly connected to the door 20 side due to a load ("W") of the door 20, a frictional force at a contact end face with the vertical locking hole 34 is increased. Therefore, friction noise is excessively generated when the door is rotated open and closed, and the friction noise generated from such a large scale door has a problem in that it is difficult to avoid it only with the material solution described above.

Furthermore, in actual situation as shown in FIG. 13, which the door 20 having an enlarged width ("Wd") as described above is installed on the supporting frame 10 of the door frame through the gear hinge unit 30 described so far and is rotated and opened through the opening and closing actuation of the door handle 20*b*, it becomes a cantilever support structure, and when the door 20 is opened, a rotational moment generated between a top and a bottom of the door on a vertical plane is increased. Therefore, a tensile stress is generated in the gear hinge unit 30 upper a neutral axis a-a' corresponding to a neutral axis (see FIG. 15*a*), and a compression stress is generated in the gear hinge unit 30 below the neutral axis a-a' (FIG. 15*b*). In particular, in the case of the door 20 including a triple glazing glass 20 G, since the degree of increase in the door weight W according to the increase in the door width Wd is large, when the door 20 is rotationally opened from the closed state of the door 20 as shown in FIG. 14 to the open state of the door 20 as shown in FIGS. 15*a* and 15*b*, an amount of deformation due to tensile or compressive stress generated in the gear hinge unit 30 may be increased. This increased amount of deformation increases the possibility of noise generation during opening and closing of the door 20 (closed section: FIG. 14 & open section: FIG. 15*a*/upper section, FIG. 15*b*/lower section), and furthermore if an amount of permanent deformation increases over time, it is difficult to close accurately.

In particular, when the door 20 is rotated and opened, as shown in the lower section of FIG. 15*b*, amount of compression deformation due to the compression stress generated in the gear hinge unit 30 below the a-a' neutral axis may be increased in proportion to the increase in door load. Therefore, if permanent compression deformation occurs in the meshing gear teeth in a state in which the gear portions 31*a* and 32*a* of the first support bracket 31 and the second support bracket 32 are meshed with each other, there is a problem in that a rotational actuation trajectory of the door itself gradually changes over time, and furthermore, there is a high possibility that an actuation noise is increased when the door is rotated.

Up to now, while explaining the problems of the prior art regarding the door hinge of a rotating door, examples of using the gear hinge unit have been mainly described, but if it has a structure that can generate excessive compressive stress or tensile stress according to the increase of the rotational moment occurring between the upper and lower sides of the door, it is reasonable to view that another hinge type door also has a technical problem substantially equal to the technical problem of the gear hinge unit even if the specific configuration of the hinge parts constituting the door hinge of the rotating door is different.

Technical Problem

The present invention is to solve the common problems of the prior art described above, and a technical object of the present invention is to achieve a door support structure through a simple device which is possible to minimize the occurrence of rotational moment between the upper and the bottom of the door with overcoming the phenomenon that the tendency to increase the rotational moment between the upper side and bottom side of the door on the vertical surface of the door hinge around the horizontal directional neutral axis of the door hinge during the door rotation opening/closing actuation due to the load of the door constituting the rotating door, intensities.

In particular, another technical object of the present invention is to provide a device by which the compressive stress and deformation occurring between the gear portions on the side of the second support bracket fixedly connected to the door side and the gear portions on the side of the first support bracket fixedly connected to the door supporting frame side to constitute the gear hinge unit of the rotating door can be minimized, and by which not only ensures and maintains accurate opening/closing performance of the door, but also minimizes damage to parts caused by friction or friction noise generated by the door hinge.

Technical Solution

In order to solve the above-described technical problem, the present invention provides an apparatus for guiding a stable rotating actuation of a gear hinge unit in a rotating door between a first support bracket fixedly connected to a supporting frame side of a door frame and the second support bracket fixedly connected to the door side in the gear hinge unit constituting the rotating door, in order to minimize a tensile stress generated in an upper part of the gear hinge unit above a neutral axis a-a' of the door and a compressive stress generated in a lower part of the gear hinge part under the neutral axis a-a' of the door by a rotational moment applied to the gear hinge unit through the second support bracket due to the load of the door, comprising:

- a fixed first vertical support installed at a lower end of the supporting frame of the door frame, comprising a fixed end fixedly installed to the supporting frame of the door frame, and a first rotational guide body being placed in a center part of a trajectory arc of the rotational actuation of the gear portion of the second support bracket of the door and having a first vertical contact surface corresponding to the trajectory in the arc of the rotational actuation of the gear portion of the second support bracket of the door; and
- a rotating second vertical support installed at a lower end of the door, comprising a fixed end fixedly installed to the door, and a second rotational guide body being placed on the trajectory arc of the rotational actuation of the gear portion of the second support bracket of the door and having a second vertical contact surface in line contact with a first vertical contact surface corresponding to the trajectory in the arc of the rotational actuation of the gear portion of the second support bracket of the door.

Herein, the present invention provides the apparatus for guiding a stable rotating actuation of a gear hinge unit in a rotating door, characterized in that in case that the first vertical contact surfaces provided to the first vertical support are convex contact surfaces, the second vertical contact surfaces provided to the second vertical support is formed by a concave contact surface; and in case that the first vertical contact surfaces provided to the first vertical support are concave contact surfaces, the second vertical contact surfaces provided to the second vertical support is formed by a convex contact surface.

And so, the apparatus characterized in that, through a rotation opening/closing process of the door, a change distance of a contact line in which a line contact is made on the first vertical contact surfaces provided in the first vertical support is formed to be larger than a change distance of a contact line in which a line contact is made on the second vertical contact surfaces provided in the second vertical support, is provided as a preferred example of the present invention.

Furthermore, it is preferable that the first vertical contact surfaces provided on the first vertical support are provided with both the concave contact surface and the convex contact surface, and the second vertical contact surfaces provided on the second vertical support are provided with both the convex contact surface and the concave contact surface corresponding to the first vertical contact surfaces, respectively.

Herein, it will be even more useful to improve the fixing force in the closed state of the door that the concave contact surface of the first vertical contact surfaces provided to the first vertical support is formed to contact the convex contact surface of the second vertical contact surfaces provided to the second vertical support in a door closed state, and in an inflection section passing an inflection point at which a contact portion is changed from the concave contact surface to the convex contact surface in the first vertical contact surfaces provided to the first vertical support, the inflection section is formed such that contact stress of the line contact portion is reduced due to an increase in a number of contact line as the contact portion is changed.

Advantageous Effects

According to the apparatus for guiding a stable rotating actuation of a gear hinge unit in a rotating door to which the present invention is applied, it can have the following effects.

According to the basic configuration of the present invention, it is possible to guide a stable rotation actuation between the first support bracket fixedly connected to the supporting frame side of a door frame and the second support bracket fixedly connected to the door side in the gear hinge unit constituting the rotating door, and it is possible to minimize a tensile stress and deformation generated in an upper part of the gear hinge unit above a neutral axis a-a' of the door and a compressive stress and deformation generated in a lower part of the gear hinge unit under the neutral axis a-a' of the door by a rotational moment applied to the gear hinge unit through the second support bracket due to the load of the door by reducing the rotational moment applied to the gear hinge unit through the second support bracket due to the load of the door. Therefore, in particular, if an amount of compressive deformation generated by the compressive stress in the gear hinge unit at the lower end of the horizontal neutral axis of the door is reduced, in the state that the gear parts of the first support bracket and the second support bracket are meshed with each other, a permanent compressive deformation induced in the meshing gear tooth portion is reduced, and it is possible to maintain the rotational actuation trajectory of the door for a longer period of time while providing the effect of reducing friction noise.

In particular, according to the preferred example of the present invention, by virtue of combining the double concave and convex surfaces by which the first vertical contact surfaces provided on the first vertical support are provided with both the concave contact surface and the convex contact surface, and the second vertical contact surfaces provided on the second vertical support are provided with both the convex contact surface and the concave contact surface corresponding to the first vertical contact surfaces, respectively, it is possible to prevent an overload condition caused by a single line contact when the door is rotated, and an effect of obtaining a more stable fixing holding force in a state close to closing of the door is provided.

In addition, according to the more preferred example of the present invention, through a rotation opening/closing process of the door, by which a change distance of a contact line in which a line contact is made on the first vertical contact surfaces provided in the first vertical support is formed to be larger than a change distance of a contact line in which a line contact is made on the second vertical contact surfaces provided in the second vertical support, the rotation actuation guide of the door proceeds more smoothly as the door progresses to the open state rather than the closed state.

BRIEF DESCRIPTION OF DRAWINGS

FIG. 4 is a folded state of the second support bracket connected to the door, and FIG. 7 shows the state that the second support bracket is rotated so that the door is fully opened.

MODES OF THE INVENTION

Hereinafter, embodiments that are easily performed by those skilled in the art will be described in detail with reference to the accompanying drawings. However, the embodiments of the present invention may be achieved in several different firms and are not limited to the embodiments described herein.

Figure 1:
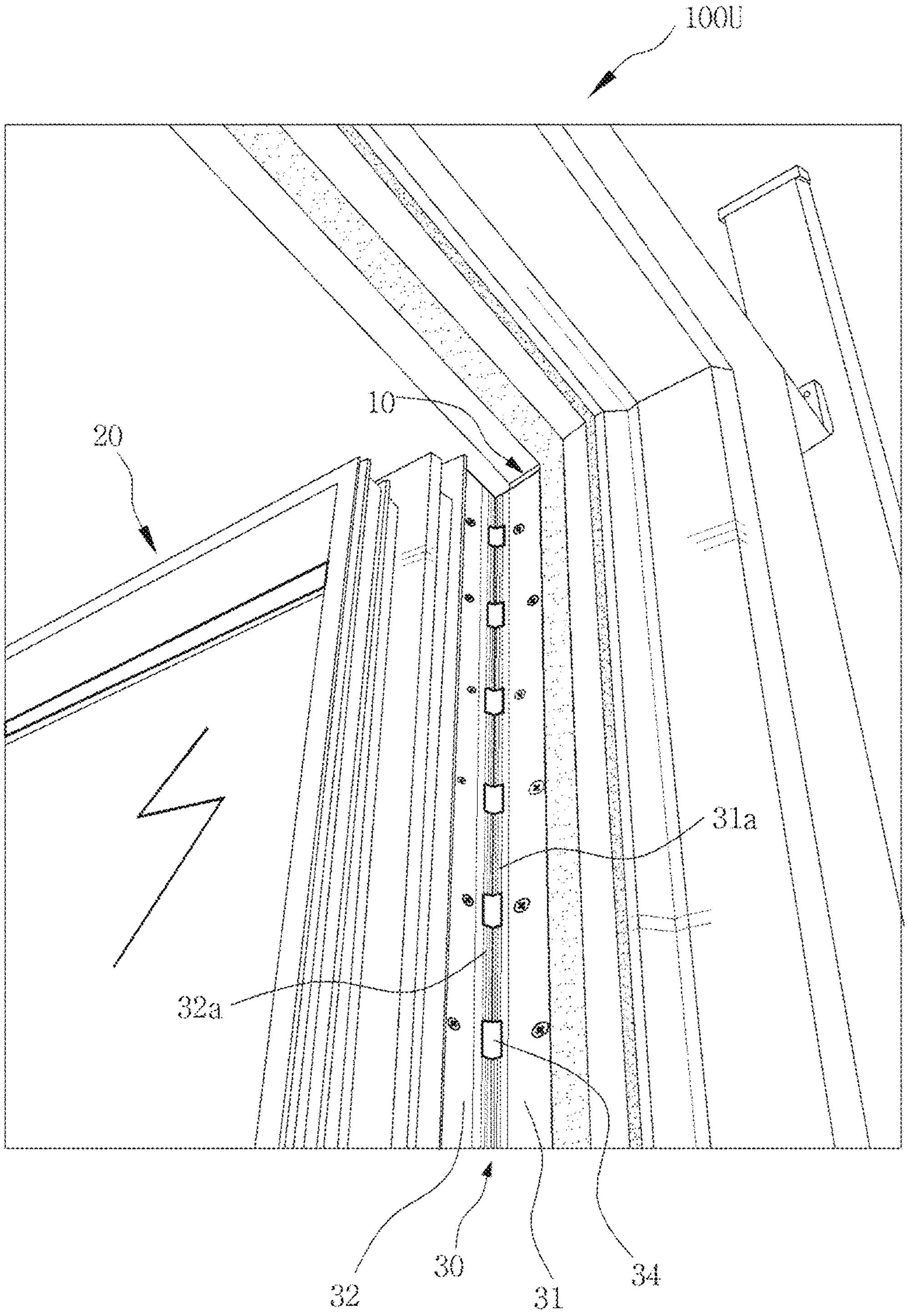
FIG. 1 is a perspective view of an installation state of a rotating door, and is an enlarged view of an upper end portion.
Figure 2:
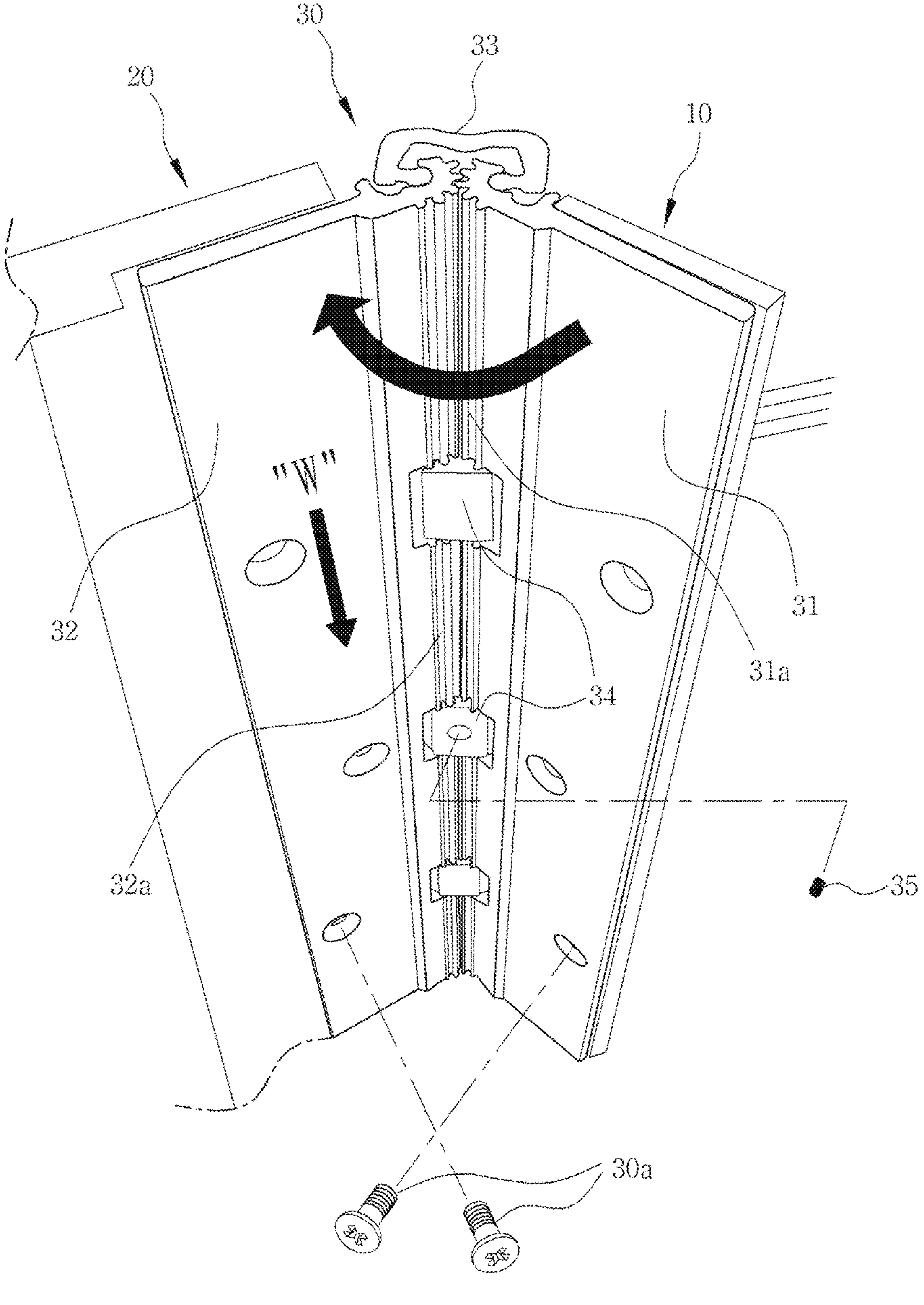
FIG. 2 is an exploded perspective view illustrating the gear hinge unit constituting the door hinge of the rotating door of FIGS. 1 and 3 separated.
Figure 3:
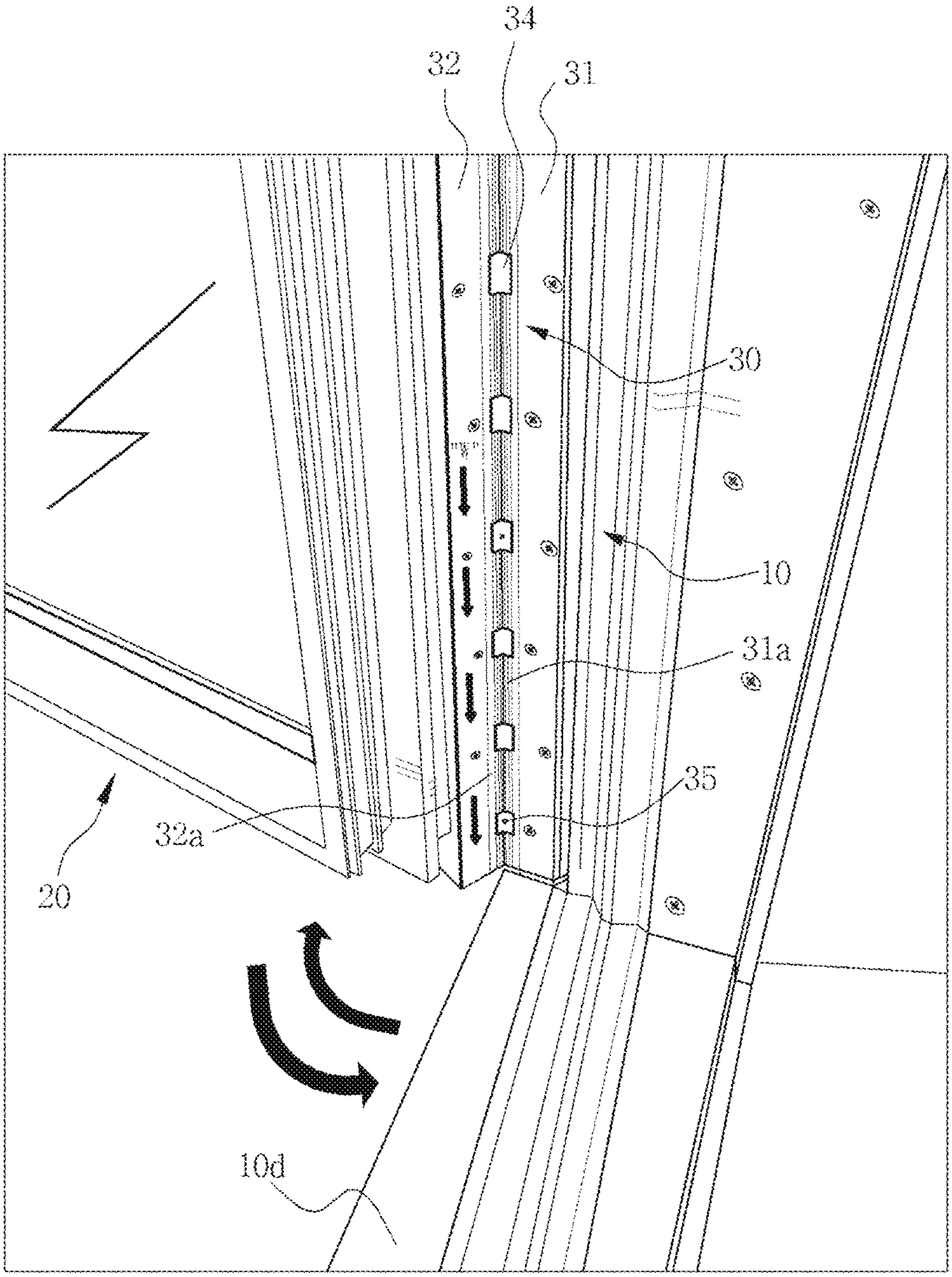
FIG. 3 is a perspective view of the installed state of the rotating door, an enlarged view of the lower end portion.
Figure 4:
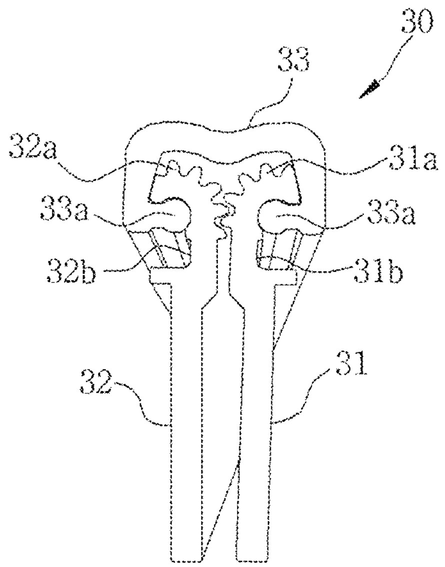
FIGS. 4 to 7 are cross-sectional views in operation of the gear hinge unit shown in FIG. 2, specially.
Figure 5:
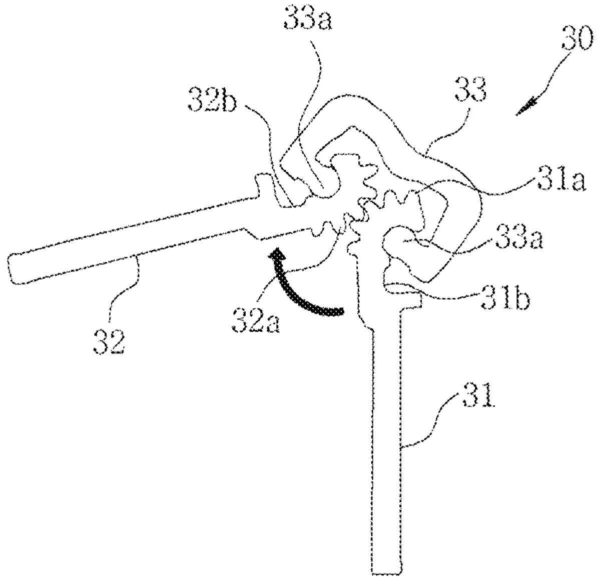
Figure 6:
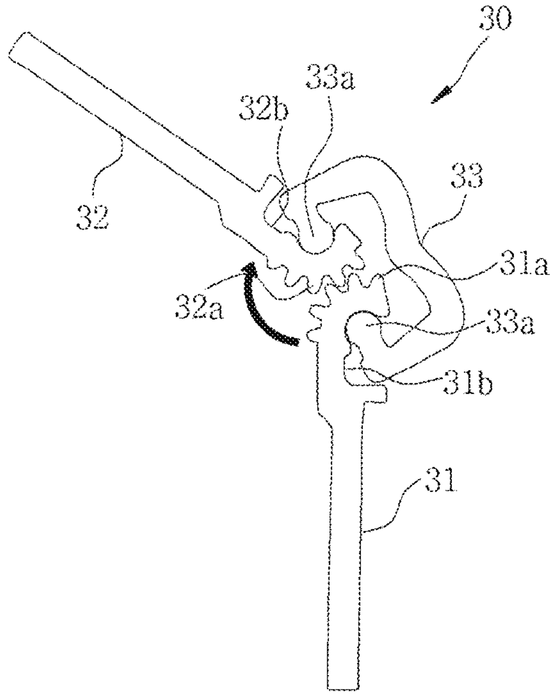
Figure 7:
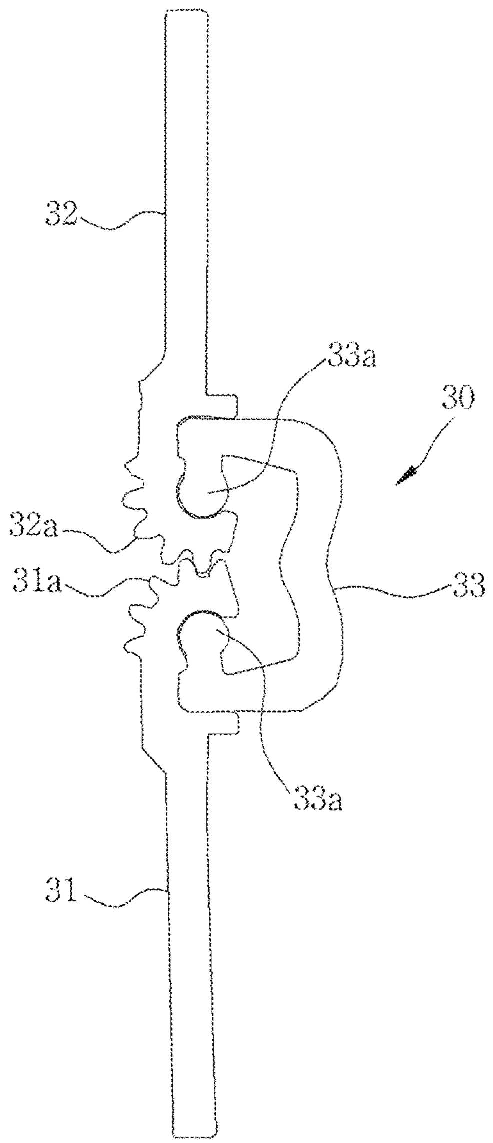
Figure 8:
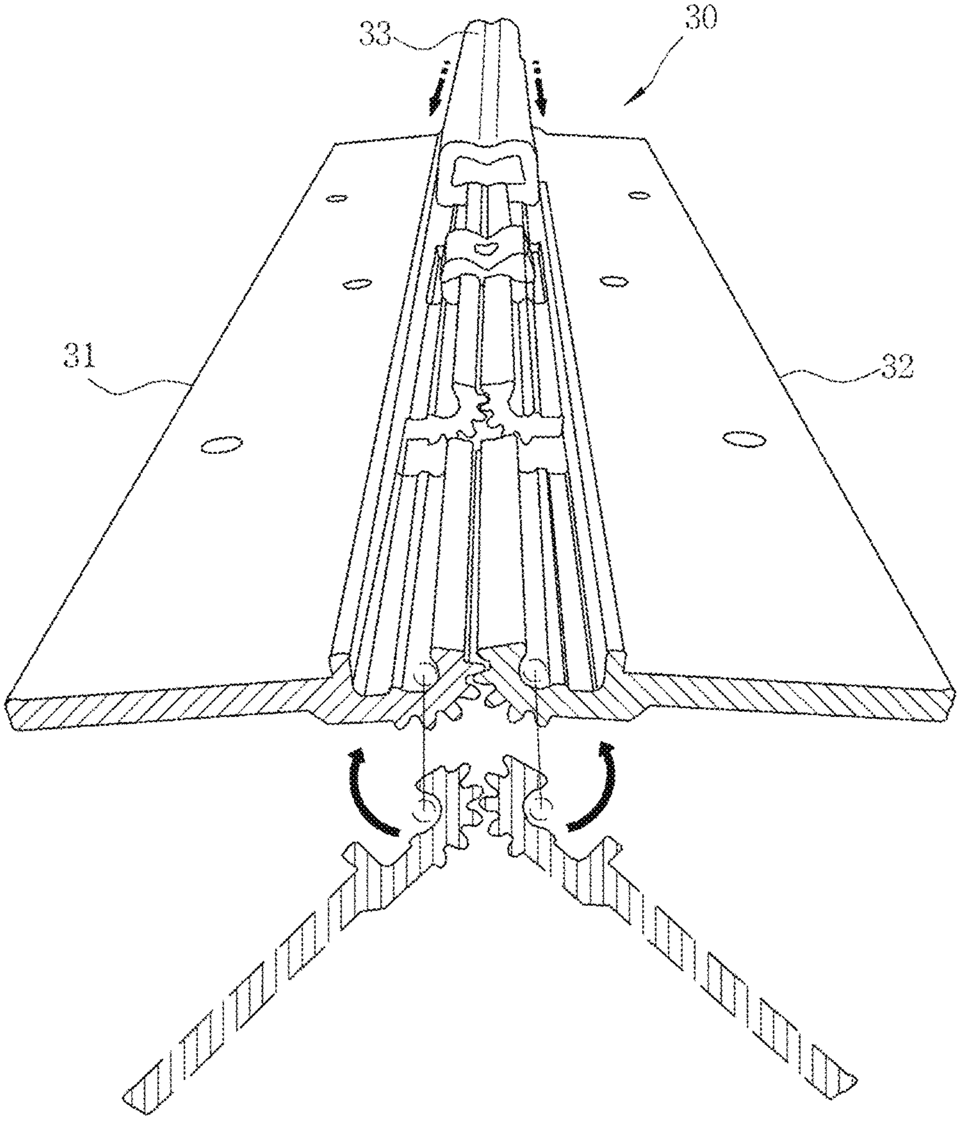
FIG. 8 is a view illustrating a change in the engagement (meshing) state of the gear unit according to a change in the rotation angle between the first support bracket and the second support bracket of the gear hinge unit.
Figure 9:
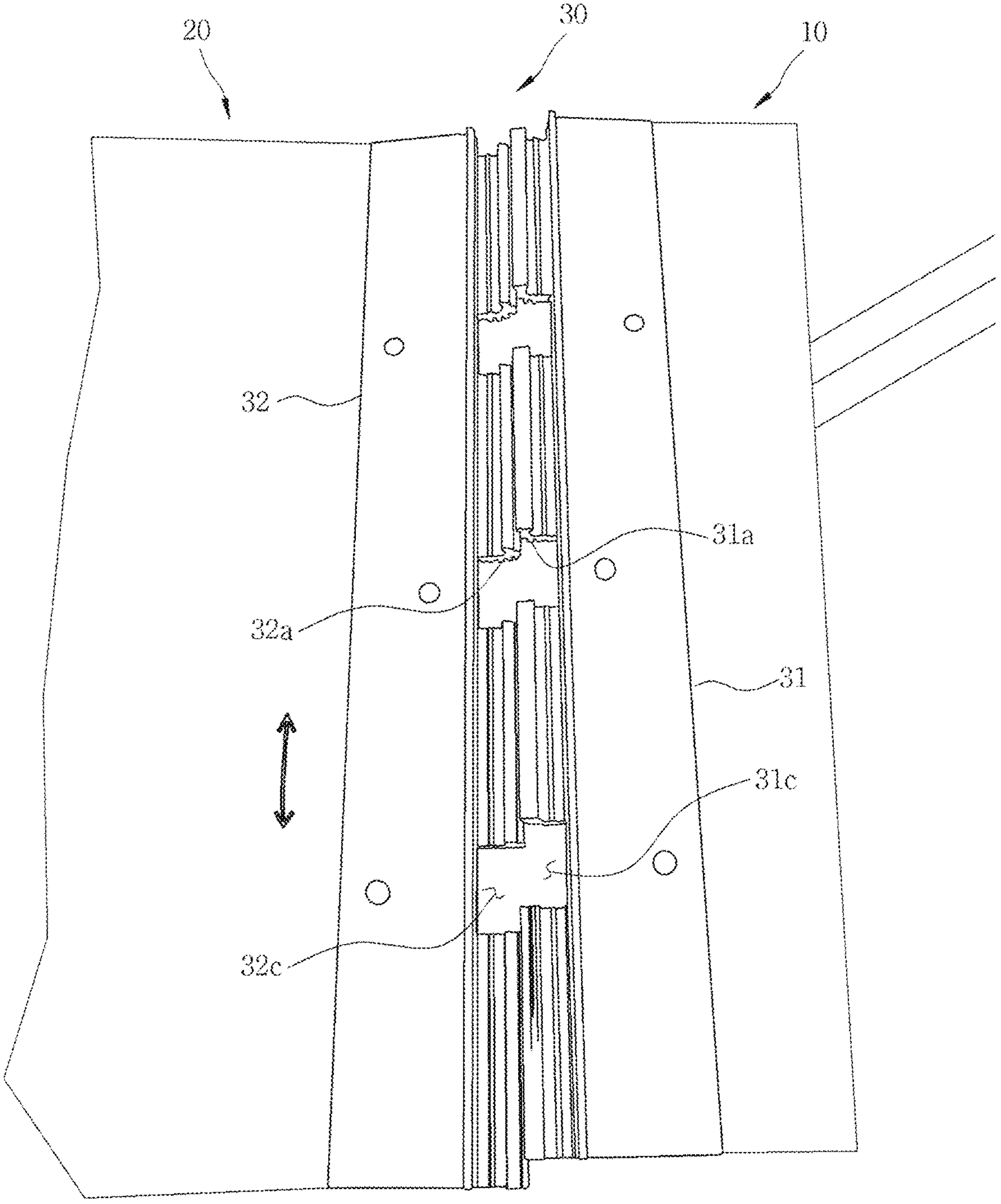
FIG. 9 is a view illustrating a state in which a vertical (longitudinal) relative displacement occurs between the first support bracket and the second support bracket of the gear hinge unit.
Figure 10:
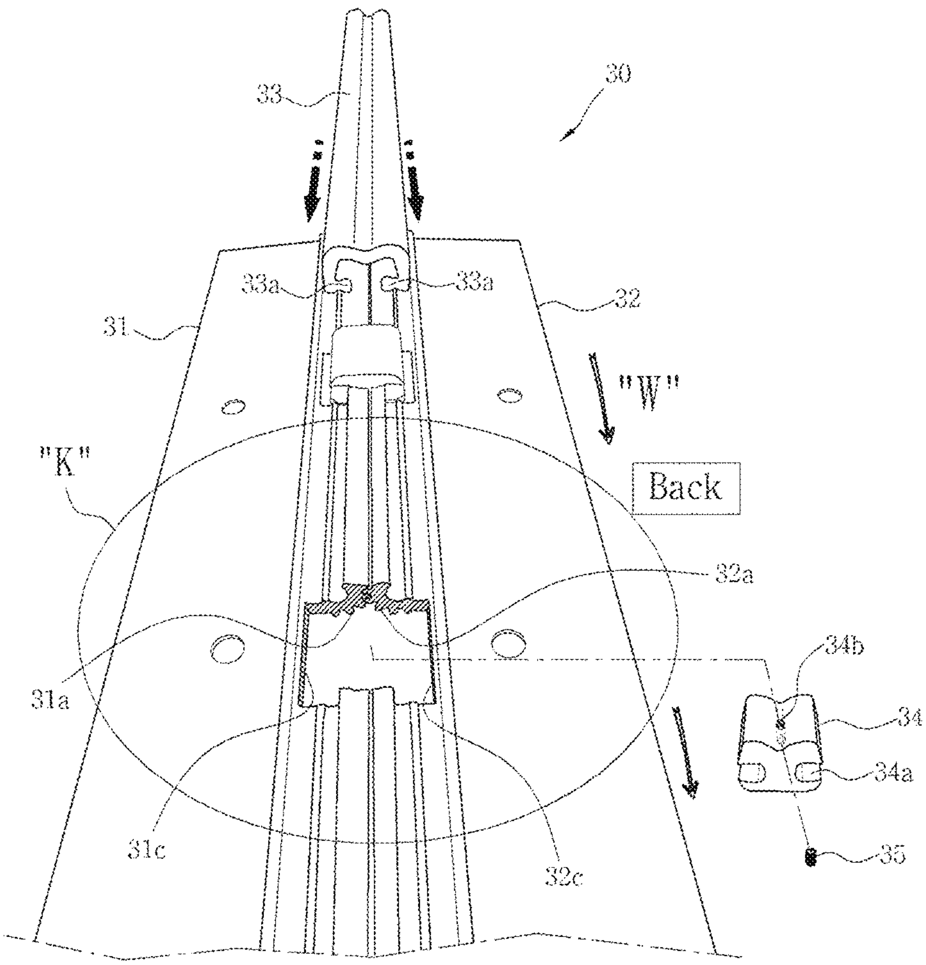
FIG. 10 is an exploded rear perspective view of the gear hinge unit.
Figure 11:
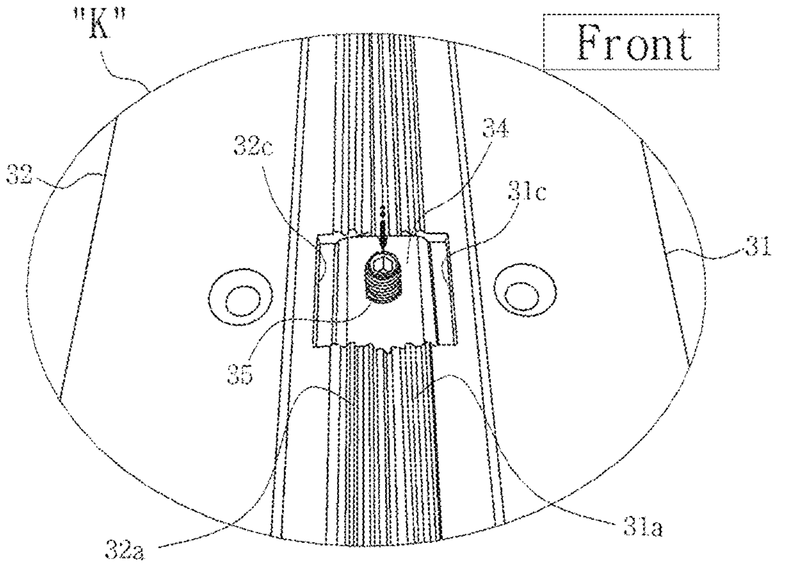
FIG. 11 is an assembly view showing the assembly state of a vertical locking means in the main part (“K”) of FIG. 10 from the front direction.
Figure 12:
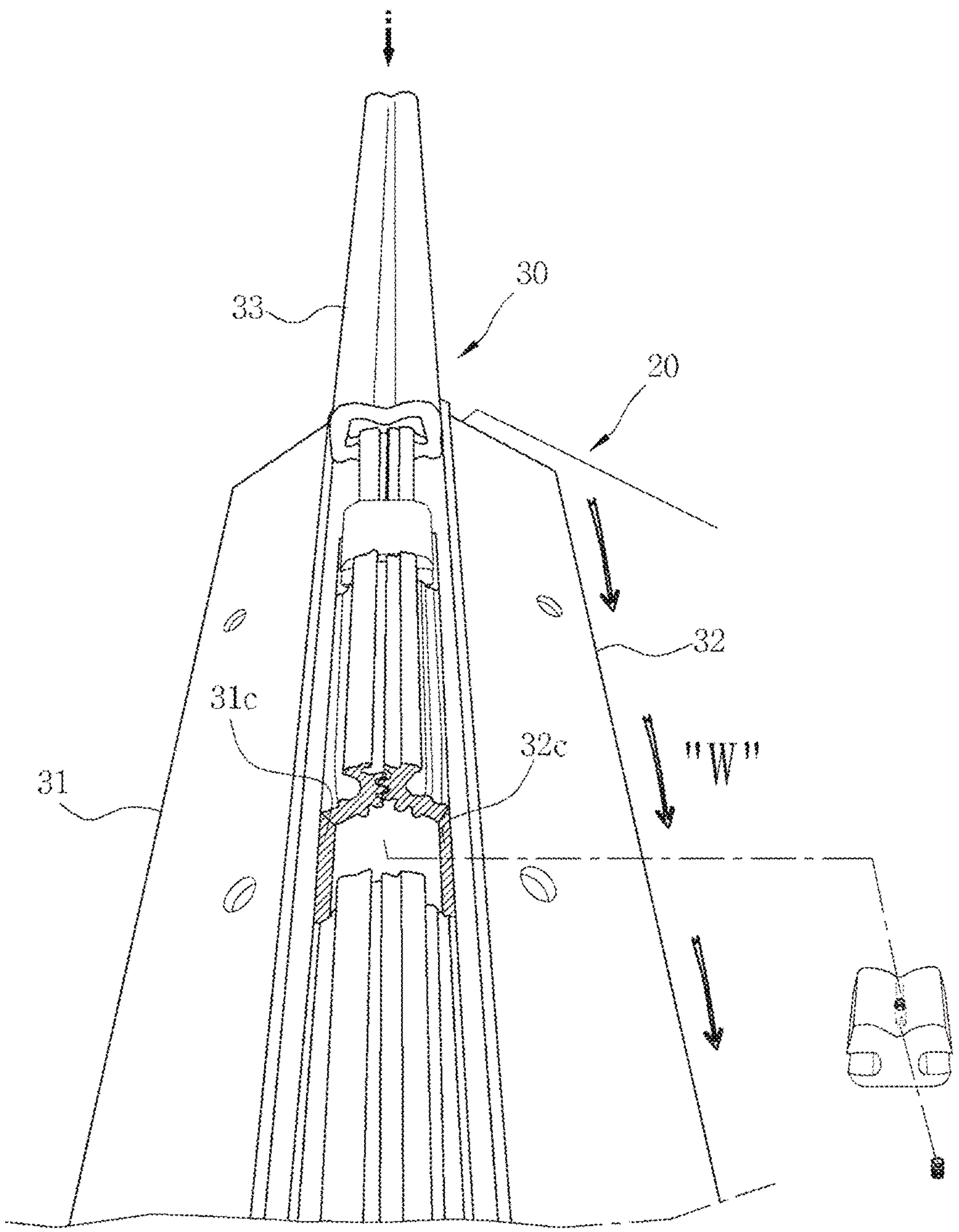
FIG. 12 is a view illustrating a state in which the meshing state of the gear part is changed according to a change in the rotation angle between the first support bracket and the second support bracket in the gear hinge unit of FIG. 10.
Figure 13:
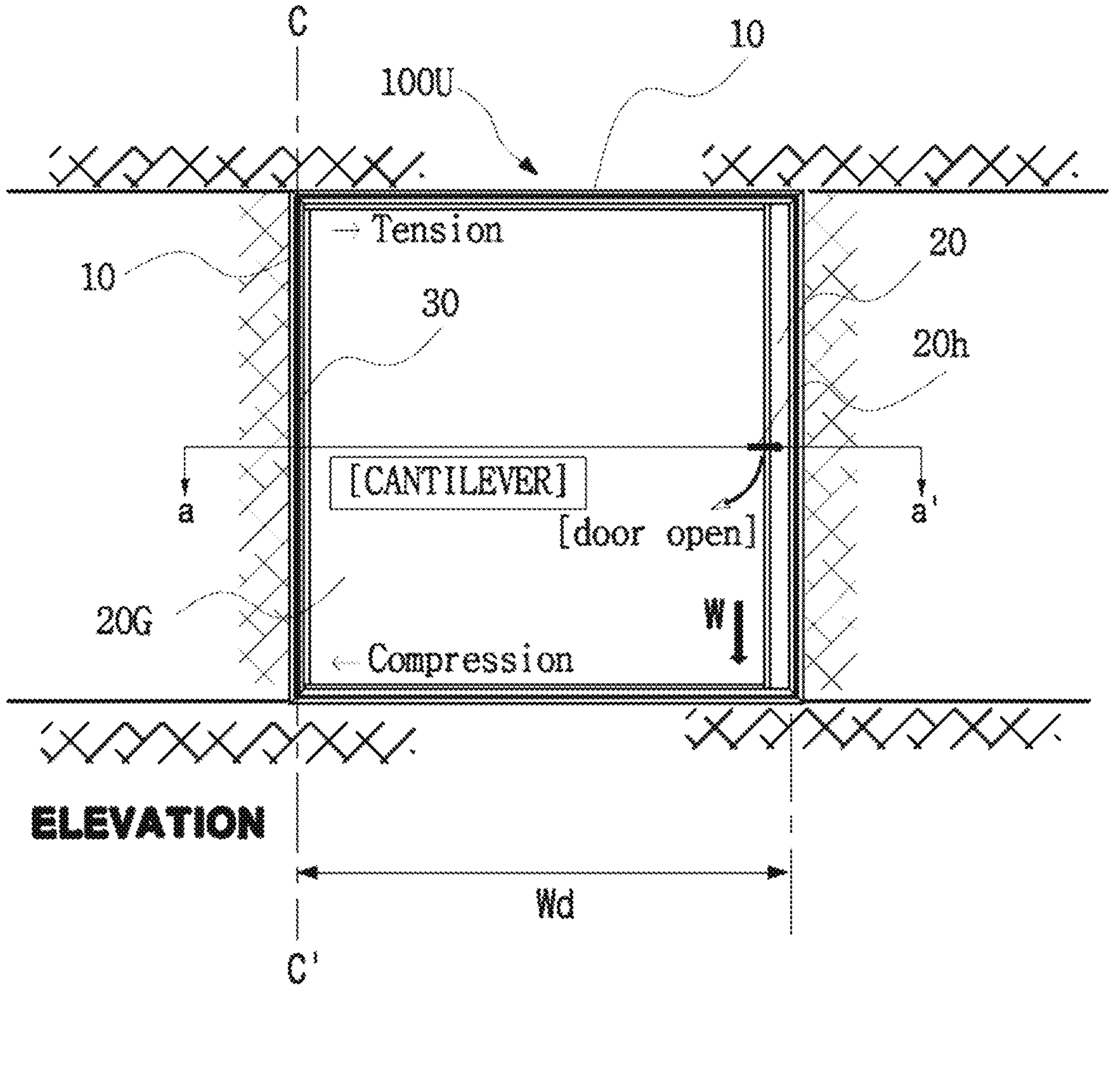
FIG. 13 is a front view showing a closed state of the door as a gear hinge unit is installed on the rotating door in a state in which the rotation actuation guide device of the gear hinge unit of the rotating door according to the present invention is not installed.
Figure 14:
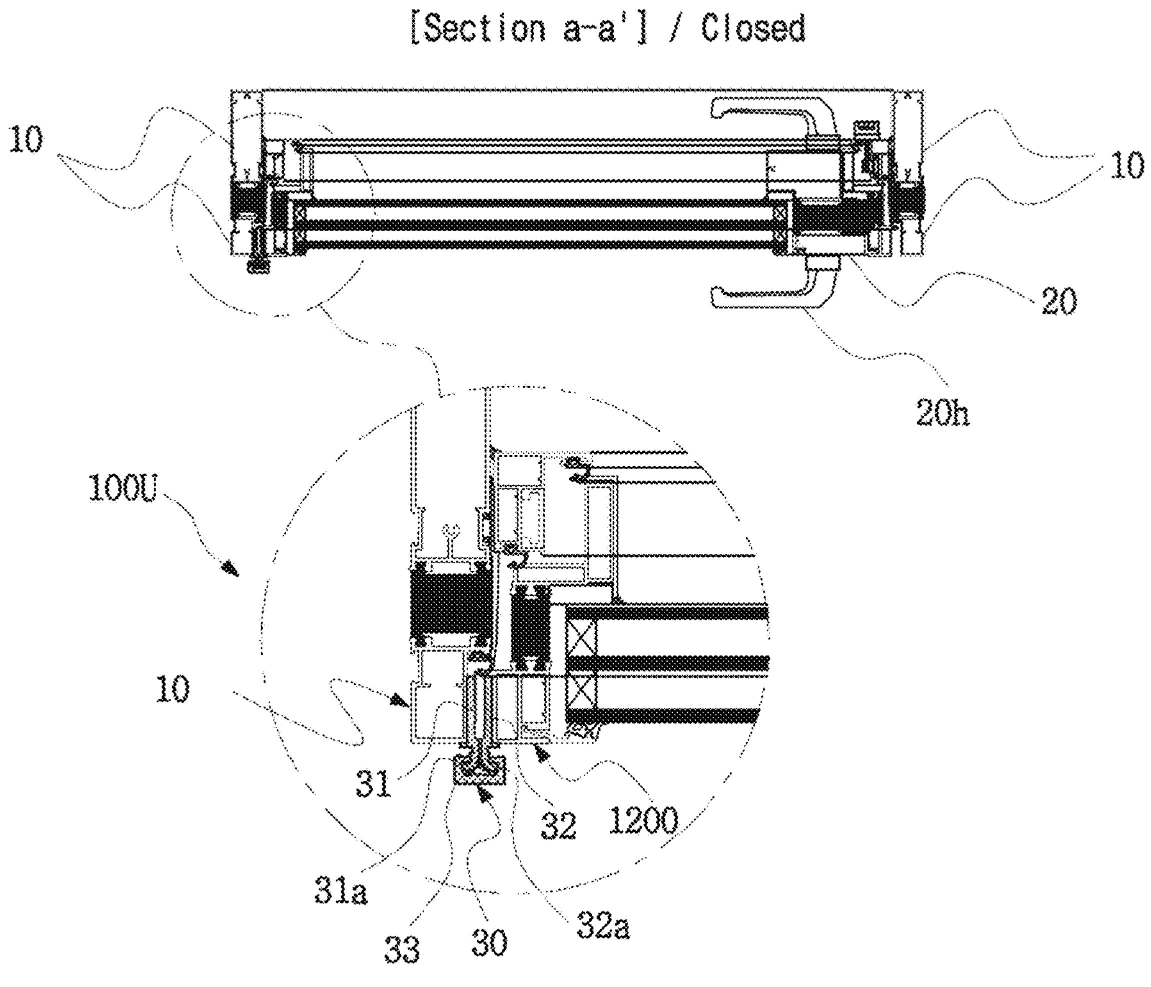
FIG. 14 is a view taken along the cross section of the line a-a of FIG. 13.
Figure 15A:
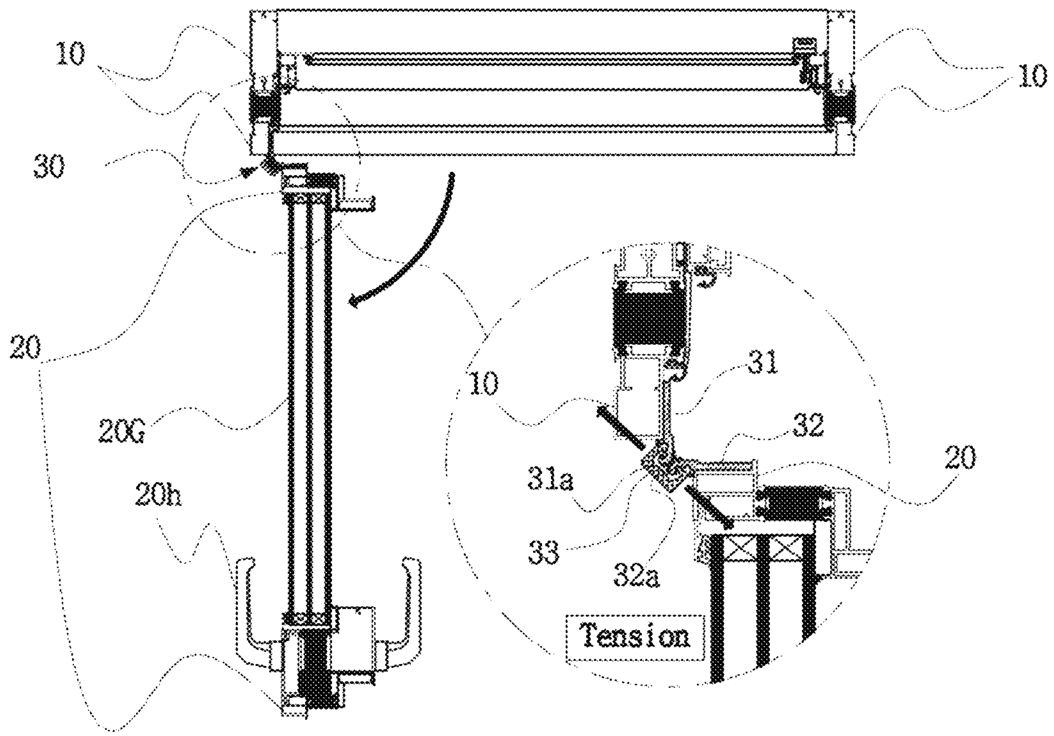
FIG. 15*a* is a view along the upper section of the line a-a' in the state in which the door is opened in FIG. 14.
Figure 15B:
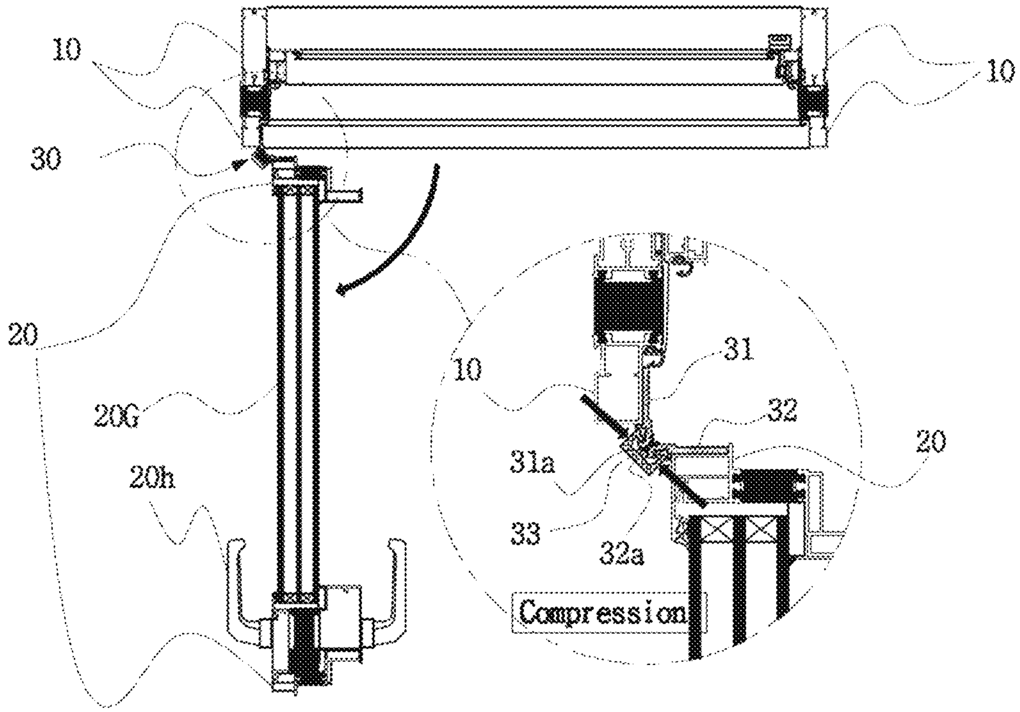
FIG. 15*b* is a view along the lower section of the line a-a' in the state in which the door is opened in FIG. 14.
Figure 16:
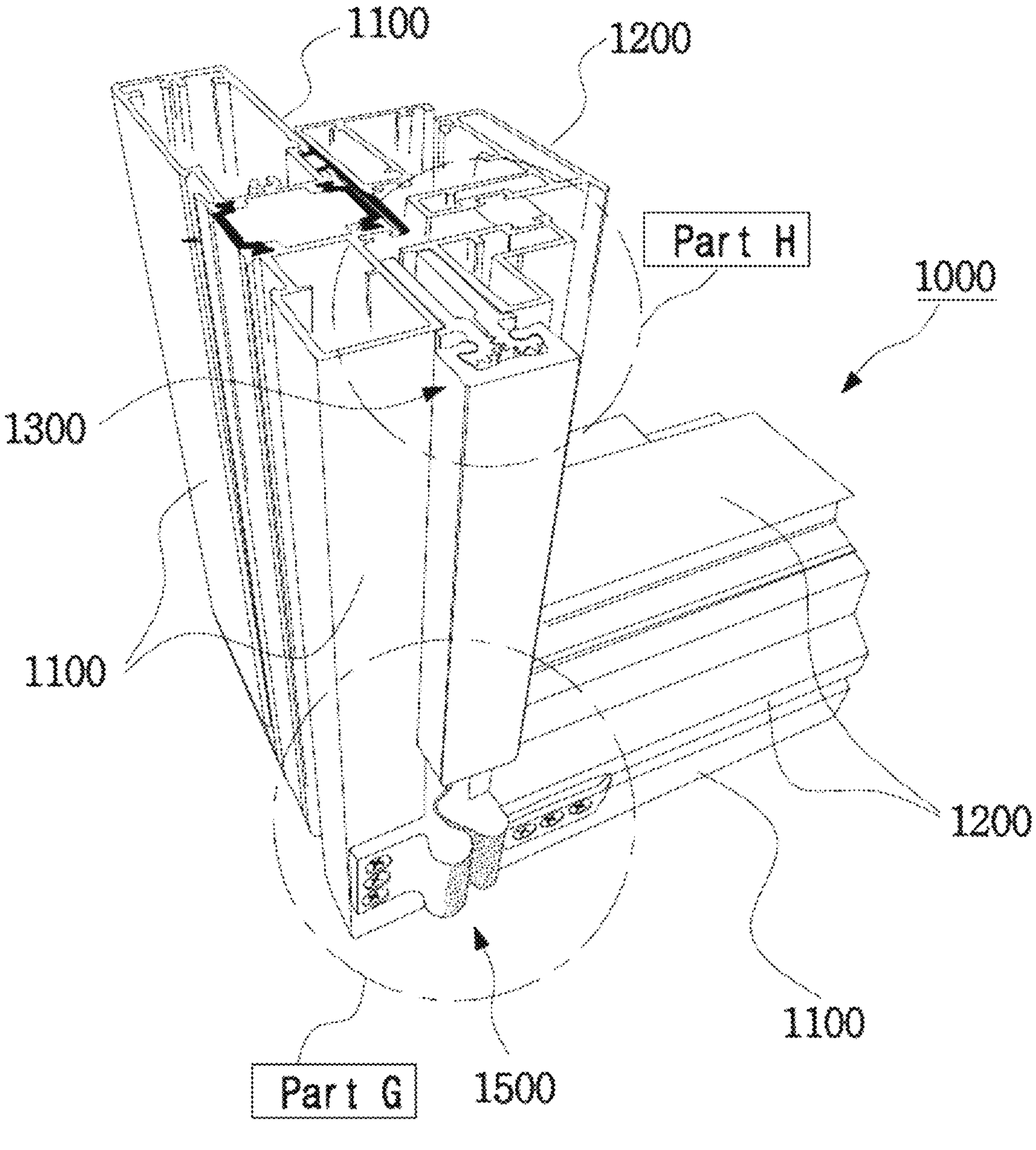
FIG. 16 is a perspective view of the lower part of the door in a closed state of the rotating door showing a preferred embodiment of the present invention.
Figure 17:
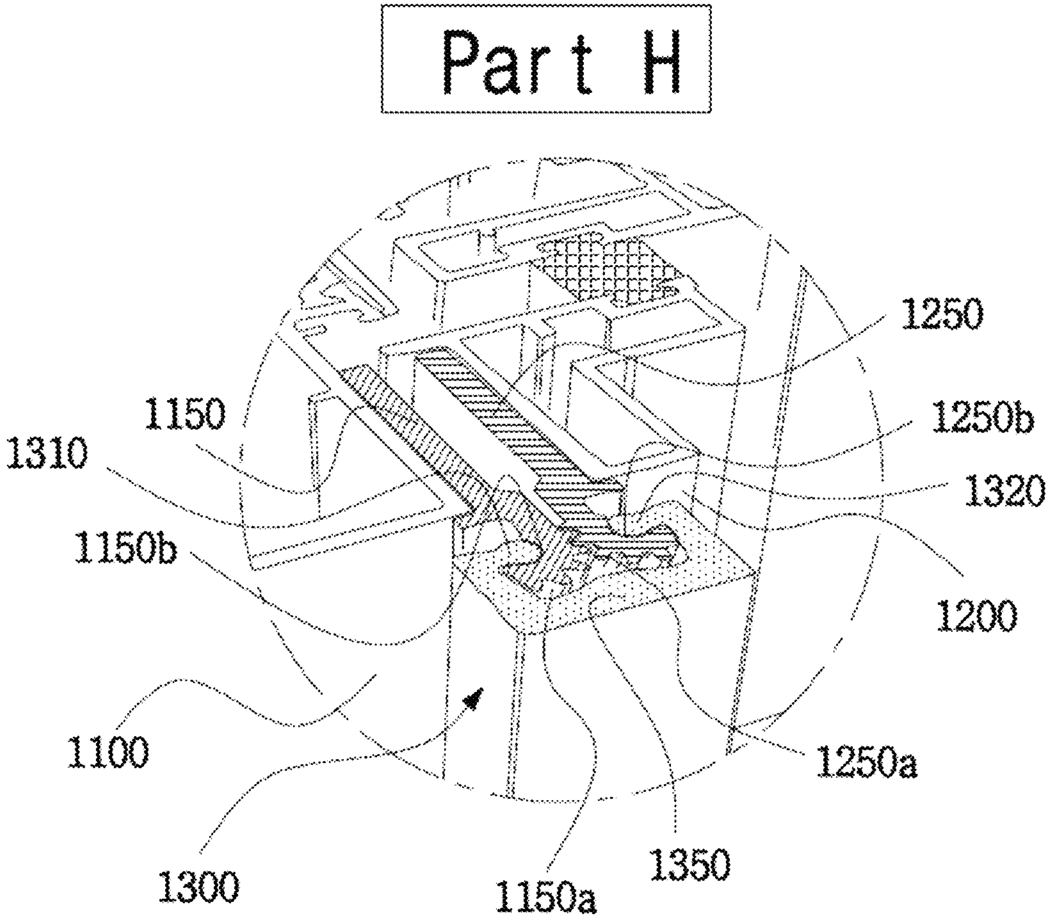
FIG. 17 is an enlarged view of the gear hinge unit (Part H) of the rotating door shown in FIG. 16.
Figure 18:
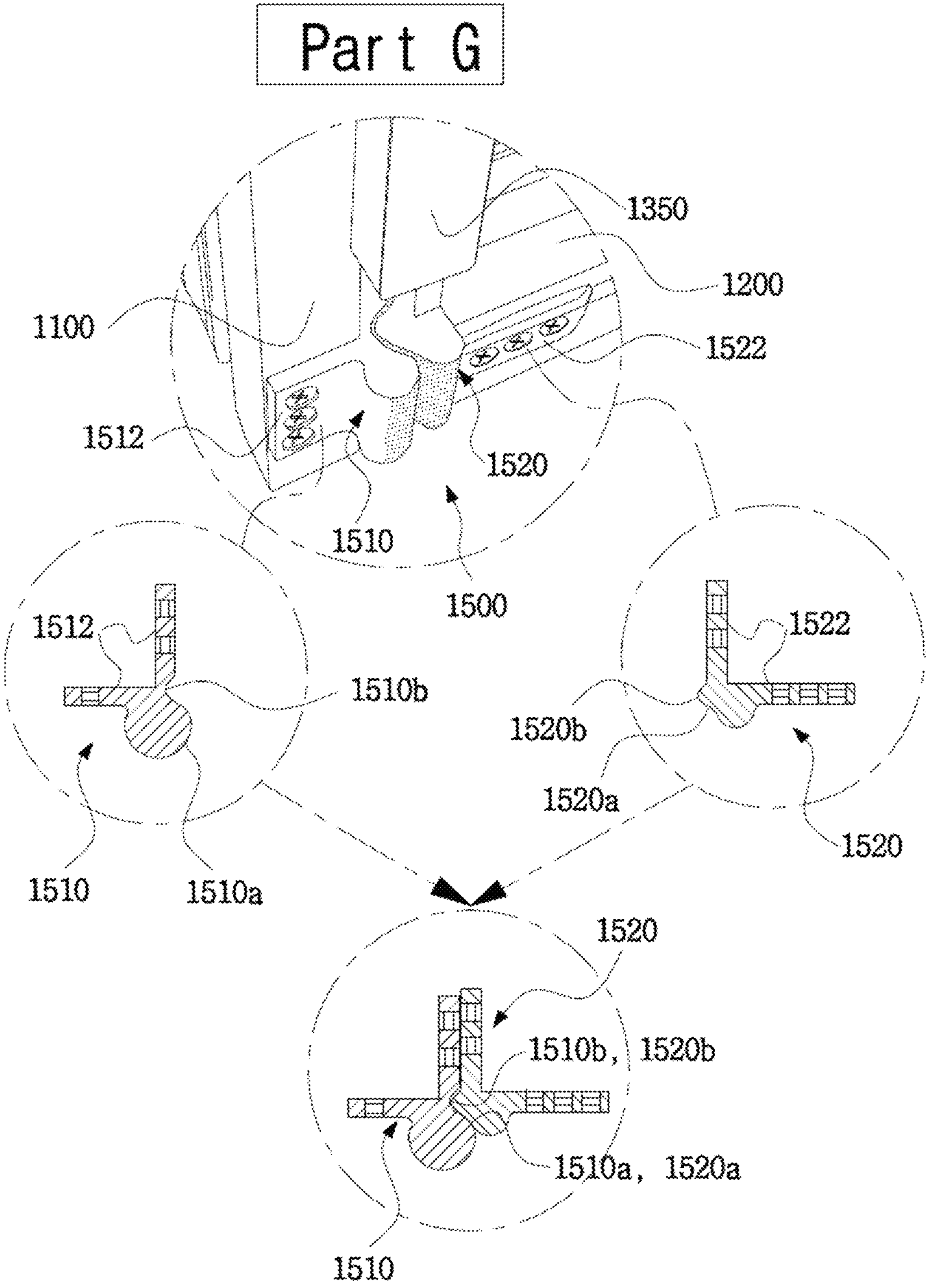
FIG. 18 is an enlarged view of the rotational actuation guide device part (Part G) installed under the gear hinge unit, and additionally includes a cross-sectional view of the coupling state between the first vertical support and the second vertical support in the closed state of the door.
Figure 19:
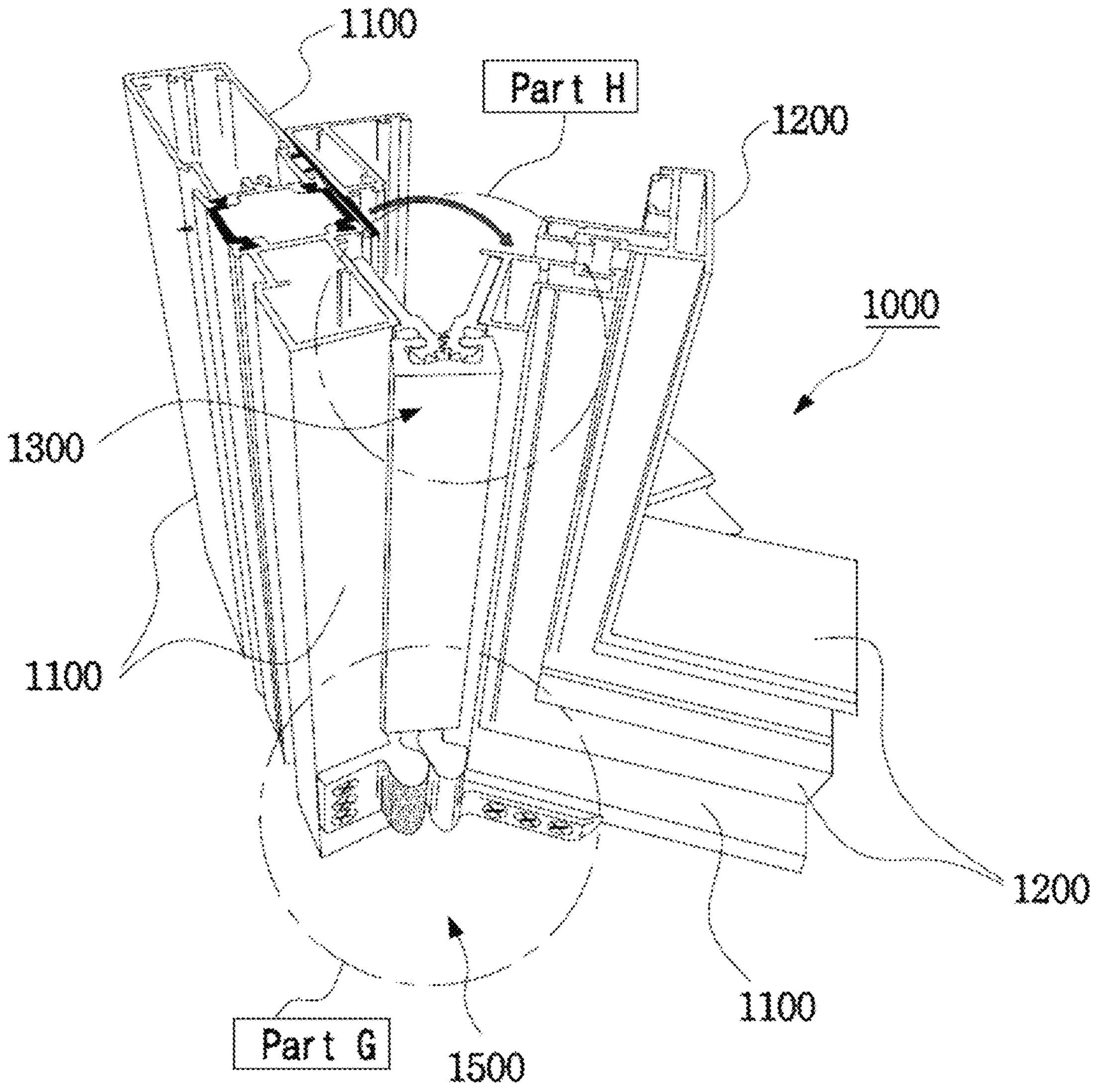
FIG. 19 is a perspective view of the lower part of the door in a state in which the door is opened at about 45° of the rotating door showing a preferred embodiment of the present invention.

FIG. 16 is a perspective view of the lower part of the door in a closed state of the rotating door showing a preferred embodiment of the present invention; FIG. 17 is an enlarged view of the gear hinge remit (Part H) of the rotating door shown in FIG. 16; and FIG. 18 is an enlarged view of the rotational actuation guide device part (Part G) installed under the gear hinge unit, and additionally includes a cross-sectional view of the coupling state between the first vertical support and the second vertical support in the closed state of the door.

Figure 20:
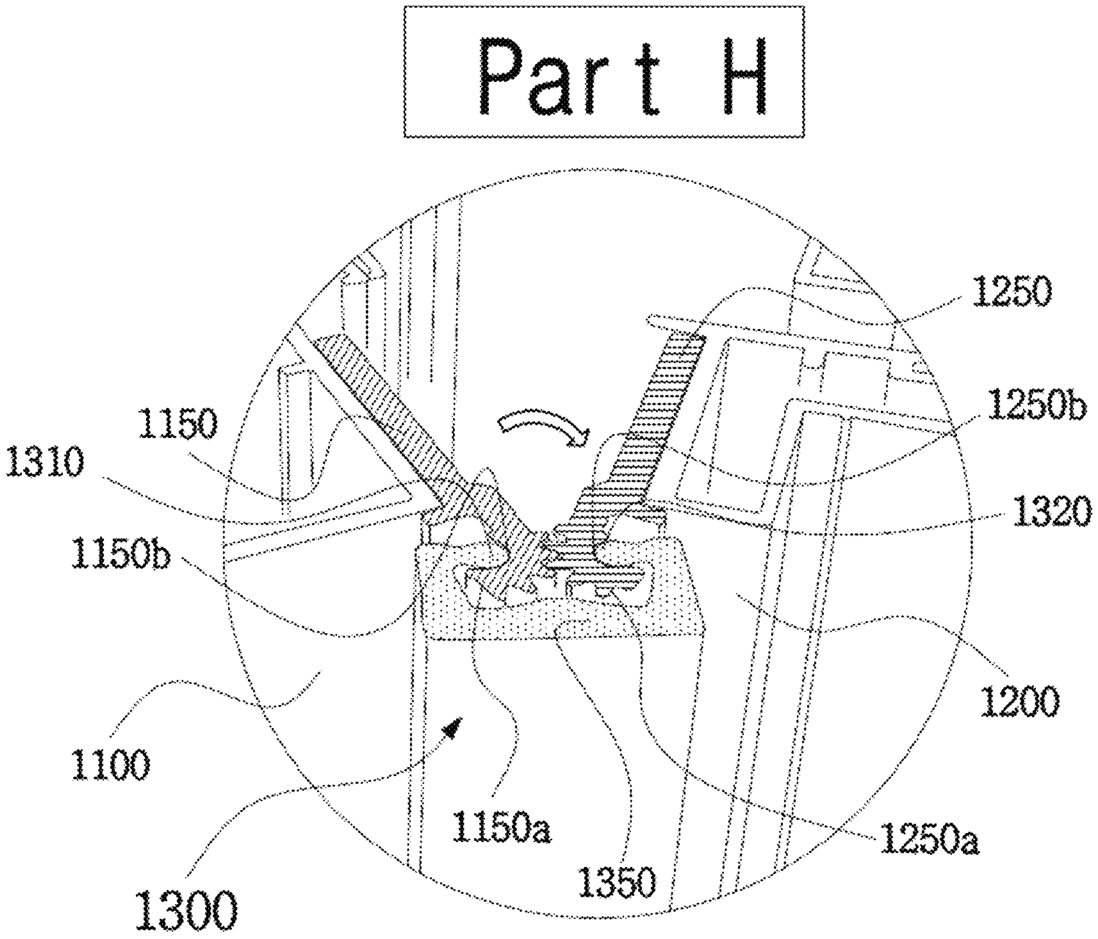
FIG. 20 is an enlarged view of a gear hinge unit (Part H) of the rotating door shown in FIG. 19.
Figure 21:
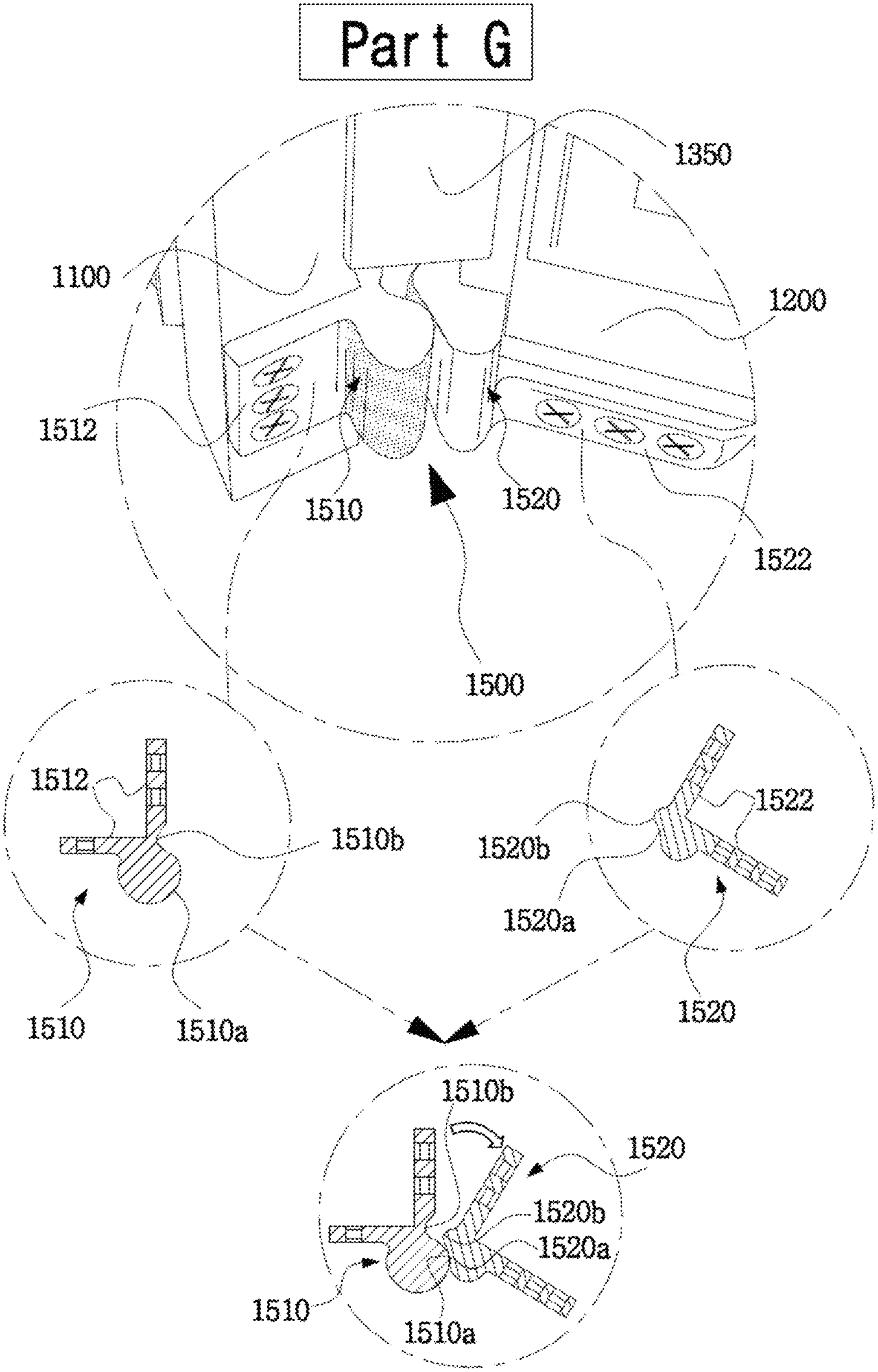
FIG. 21 is an enlarged view of the rotational actuation guide device part (Part G) installed under the gear hinge unit, and additionally includes a cross-sectional view of the coupling state between the first vertical support and the second vertical support when the door is opened by about 45°.
Figure 22:
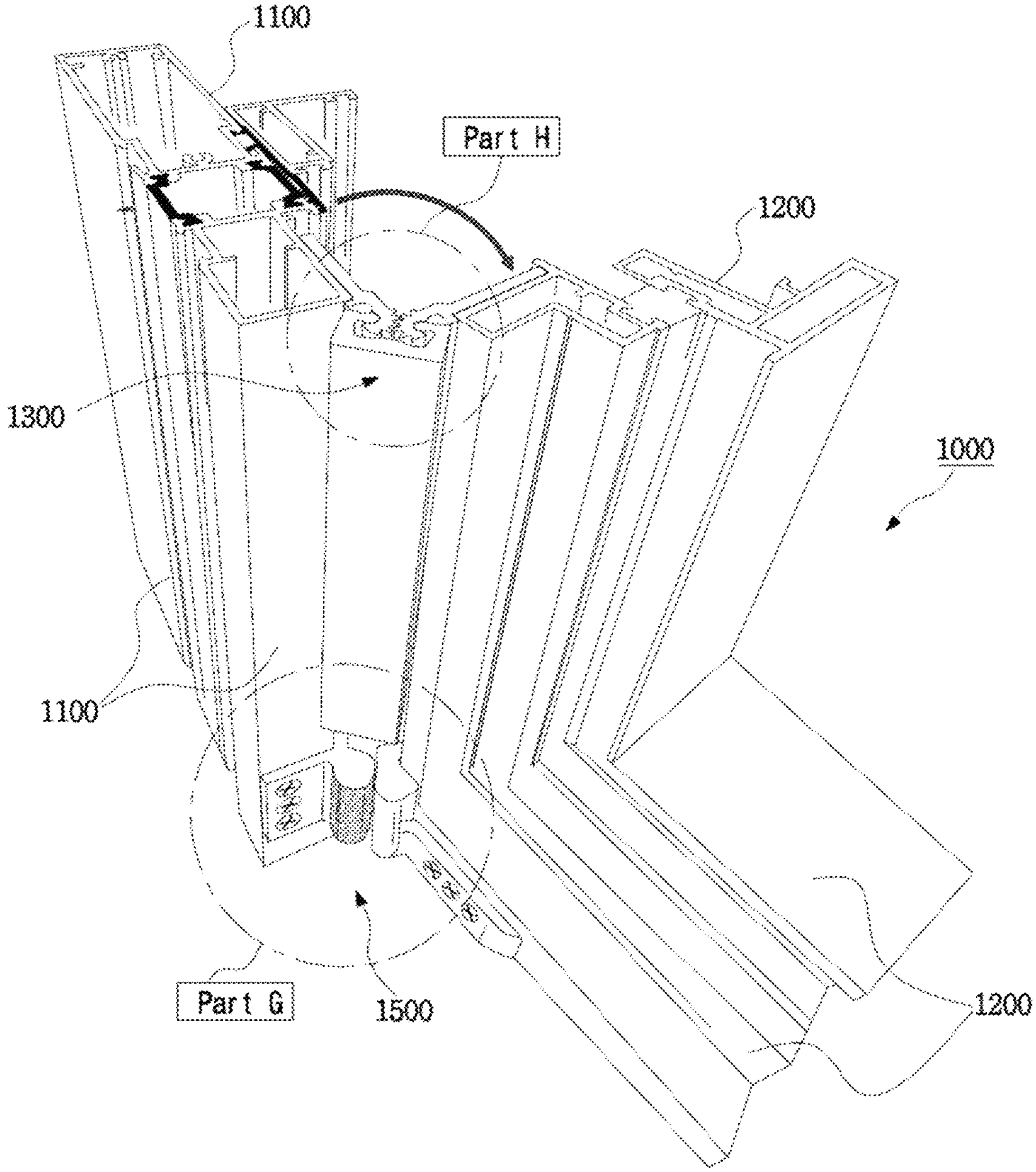
FIG. 22 is a perspective view of the lower part of the door in a state in which the door is opened by about 90° of the rotating door showing a preferred embodiment of the present invention.
Figure 23:
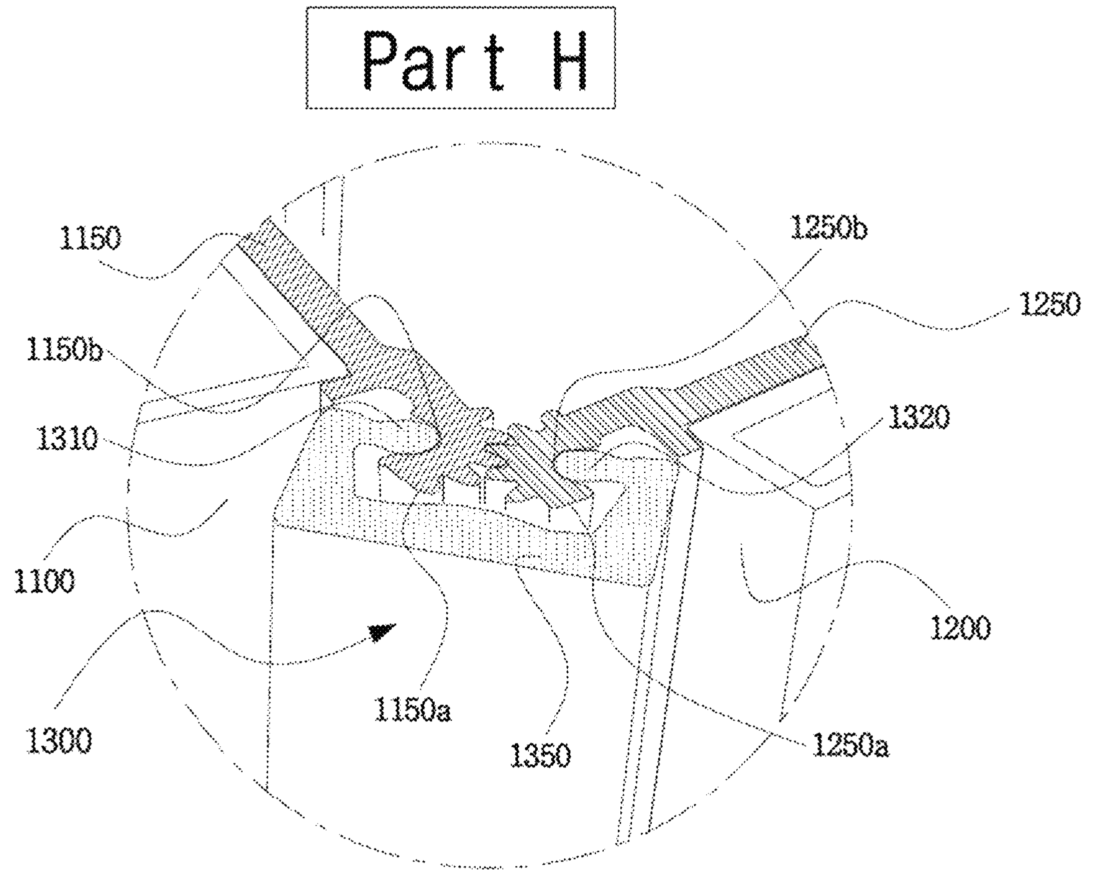
FIG. 23 is an enlarged view of a gear hinge unit (Part H) of the rotating door shown in FIG. 22.
Figure 24:
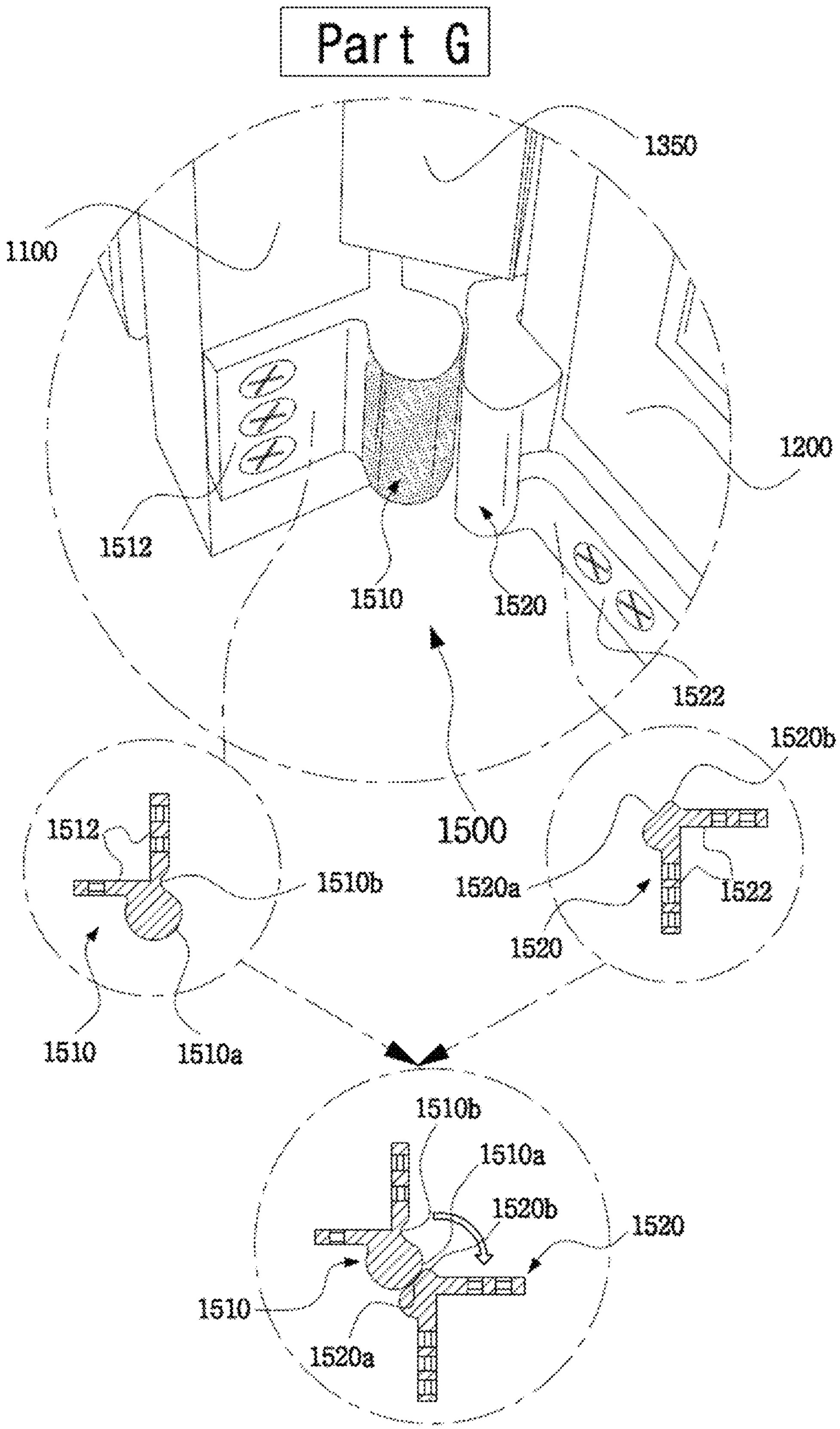
FIG. 24 is an enlarged view of the rotational actuation guide device (Part G) installed under the gear hinge unit, additionally includes a cross-sectional view of the coupling state between the first vertical support and the second vertical support in the state that the door is opened by about 90°.

Also, reference may be made to FIGS. 20 to 22 as views respectively corresponding to FIGS. 16 to 19 as views of a state in which the door is opened by about 45°. In addition, as a view of a state in which the door is opened by about 90°, reference may be made to FIGS. 23 to 25 as views respectively corresponding to FIGS. 16 to 19 or FIGS. 20 to 22 above.

First, a preferred embodiment of the rotation actuation guide device of the rotating door according to the present invention will be described with reference to the accompanying drawings.

As shown in FIGS. 17 to 24, a preferred embodiment of the present invention provide an apparatus for guiding a stable rotating actuation of a gear hinge unit in a rotating door between a first support bracket 1150 fixedly connected to a supporting frame 1100 side of a door frame and the second support bracket 1250 fixedly connected to the door 1200 side in the gear hinge unit 1300 constituting the rotating door 1000, in order to minimize a tensile stress generated in an upper part of the gear hinge unit 1300 above a neutral axis a-a' of the door 1200 and a compressive stress generated in a lower part of the gear hinge unit 1300 under the neutral axis a-a' of the door 1200 by a rotational moment applied to the gear hinge unit 1300 through the second support bracket 1250 due to the load of the door 1200, comprising:

a fixed first vertical support 1510 installed at a lower end of the supporting frame 1100 of the door frame, comprising a fixed end 1512 fixedly installed to the supporting frame 1100 of the door frame, and a first rotational guide body being placed in a center part of a trajectory arc of the rotational actuation of the gear portion **1250*a* of the second support bracket 1250 of the door 1200 and having a first vertical contact surface 1510*a*, 1510*b* corresponding to the trajectory in the arc of the rotational actuation of the gear portion 1250***a* of the second support bracket 1250 of the door 1200; and a rotating second vertical support 1520 installed at a lower end of the door 1200, comprising a fixed end 1522 fixedly installed to the door 1200, and a second rotational guide body being placed on the trajectory arc of the rotational actuation of the gear portion 1250*a* of the second support bracket 1250 of the door 1200 and having a second vertical contact surface 1520*a*, 1520*b* in line contact with a first vertical contact surface 1510*a*, 1510*b* corresponding to the trajectory in the arc of the rotational actuation of the gear portion 1250*a* of the second support bracket 1250 of the door 1200.

Here, the rotation actuation guide device 1500 of the gear hinge unit is well shown in FIGS. 16, 18, 19, 21, 22, 24, and 26, the apparatus for guiding a stable rotating actuation of a gear hinge unit in a rotating door is characterized in that, in case that the first vertical contact surfaces 1510*a* and 1510*b* provided to the first vertical support 1510 are convex contact surfaces 1510*a*, the second vertical contact surfaces 1520*a*, 1520*b* provided to the second vertical support 1520 is formed by a concave contact surface 1520*a*; and in case that the first vertical contact surfaces 1510*a* and 1510*b* provided to the first vertical support 1510 are concave contact surfaces 1510*b*, the second vertical contact surfaces 1520*a*, 1520*b* provided to the second vertical support 1520 is formed by a convex contact surface 1520.

Figure 25:
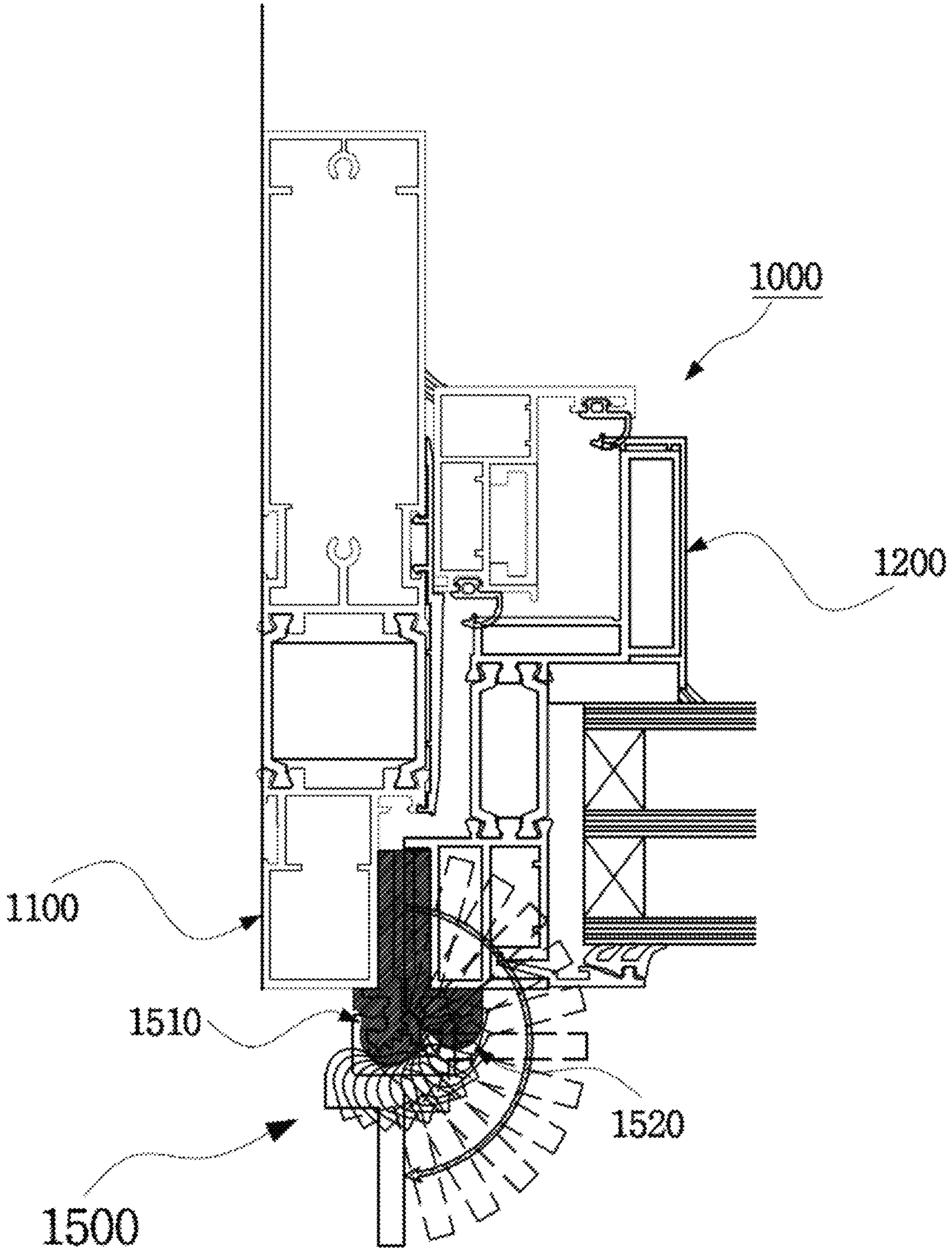
FIG. 25 is a operation state diagram showing a change in the position of the second vertical support relative to the first vertical support in the fixed position during the rotational opening and closing actuation of the door in the range of about 180° in the door in which the rotation actuation guide device according to the present invention is installed.
Figure 26:
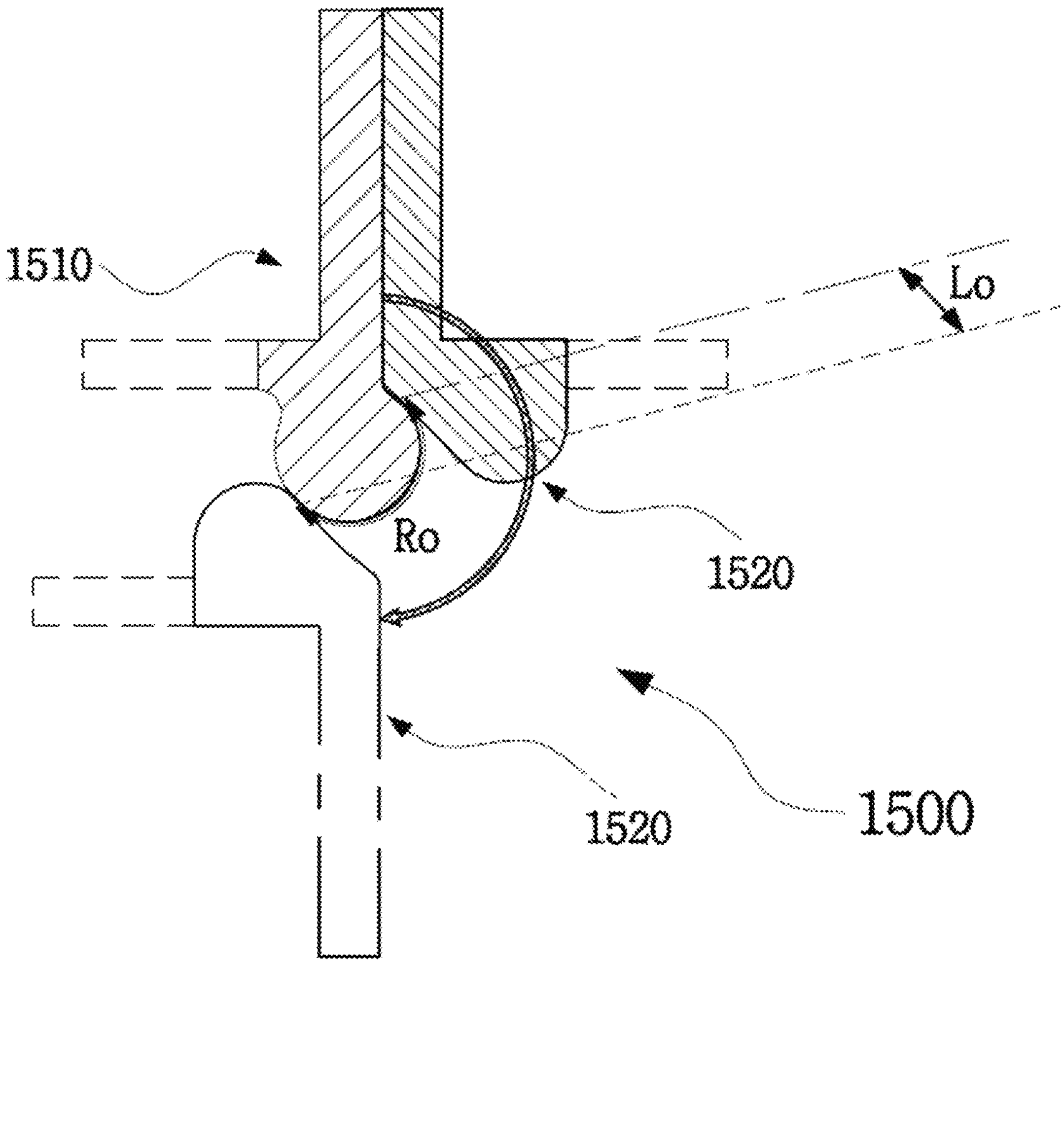
FIG. 26 is an enlarged view illustrating portions of the first vertical support and the second vertical support in FIG. 25.

In addition, according to a preferred embodiment of the present invention, as shown in FIG. 26, which shows an enlarged view of the first vertical support and the second vertical support for about 180° door rotation range shown in FIG. 25, the apparatus for guiding a stable rotating actuation of a gear hinge unit in a rotating door is characterized in that, through a rotation opening/closing process of the door 1200, a change distance Ro of a contact line in which a line contact is made on the first vertical contact surfaces 1510*a* and 1510*b* provided in the first vertical support 1510 is formed to be larger than a change distance Lo of a contact line in which a line contact is made on the second vertical contact surfaces 1520*a* and 1520*b* provided in the second vertical support 1520.

Furthermore, the apparatus for guiding a stable rotating actuation of a gear hinge unit in a rotating door is characterized in that the first vertical contact surfaces 1510*a* and 1510*b* provided on the first vertical support 1510 are provided with both the concave contact surface 1510*a* and the convex contact surface 1510*b*, and the second vertical contact surfaces 1520*a* and 1520*b* provided on the second vertical support 1520 are provided with both the convex contact surface 1520*b* and the concave contact surface 1520*a* corresponding to the first vertical contact surfaces 1510*a* and 1510*b*, respectively.

Herein, if the apparatus for guiding a stable rotating actuation of a gear hinge unit in a rotating door is characterized in that the concave contact surface 1510*b* of the first vertical contact surfaces 1510*a*, 1510*b* provided to the first vertical support 1510 is formed to contact the convex contact surface 1520*b* of the second vertical contact surfaces 1520*a* and 1520*b* provided to the second vertical support 1520 in a door closed state, it will provide a more desirable effect in improving the fixing force of the door closed state, in addition, if the apparatus for guiding a stable rotating actuation of a gear hinge unit in a rotating door is characterized in that, in an inflection section passing an inflection point at which a contact portion is changed from the concave contact surface 1510*b* to the convex contact surface 1510*a* in the first vertical contact surfaces 1510*a*, 1510*b* provided to the first vertical support 1510, the inflection section is formed such that contact stress of the line contact portion is reduced due to an increase in a number of contact line as the contact portion is changed, it will provide a more and more desirable effect in improving the fixing force of the door closed state.

The invention claimed is:

1. An apparatus for guiding a stable rotating actuation of a gear hinge unit in a rotating door between a first support bracket (1150) fixedly connected to a supporting frame (1100) side of a door frame and a second support bracket (1250) fixedly connected to a door (1200) side in the gear hinge unit (1300) constituting the rotating door (1000), in order to minimize a tensile stress generated in an upper part of the gear hinge unit (1300) above a neutral axis (a-a') of the door (1200) and a compressive stress generated in a lower part of the gear hinge unit (1300) under the neutral axis (a-a') of the door (1200) by a rotational moment applied to the gear hinge unit (1300) through the second support bracket (1250) due to the load of the door (1200), comprising:

a fixed first vertical support (1510) installed at a lower end of the supporting frame (1100) of the door frame, comprising a fixed end (1512) fixedly installed to the supporting frame (1100) of the door frame, and a first rotational guide body being placed in a center part of a trajectory arc of the rotational actuation of a gear portion (1250*a*) of the second support bracket (1250) of the door (1200) and having a first vertical contact surface (1510*a*), (1510*b*) corresponding to a trajectory arc of a rotational actuation of the gear portion (1250*a*) of the second support bracket (1250) of the door (1200); and a rotating second vertical support (1520) installed at a lower end of the door (1200), comprising a fixed end (1522) fixedly installed to the door (1200), and a second rotational guide body being placed on the trajectory arc of the rotational actuation of the gear portion (1250*a*) of the second support bracket (1250) of the door (1200) and having a second vertical contact surface (1520*a*), (1520*b*) in line contact with a first vertical contact surface (1510*a*), (1510*b*) corresponding to the trajectory arc of the rotational actuation of the gear portion (1250*a*) of the second support bracket (1250) of the door (1200).

2. The apparatus according to claim 1, characterized in that, in case that the first vertical contact surfaces (1510*a*) and (1510*b*) provided to the first vertical support (1510) are convex contact surfaces (1510*a*), the second vertical contact surfaces (1520*a*), (1520*b*) provided to the second vertical support 1520 is formed by a concave contact surface (1520*a*); and in case that the first vertical contact surfaces (1510*a*) and (1510*b*) provided to the first vertical support (1510) are concave contact surfaces (1510*b*), the second vertical contact surfaces (1520*a*), (1520*b*) provided to the second vertical support 1520 is formed by a convex contact surface (1520*b*).

3. The apparatus according to claim 2, characterized in that, through a rotation opening/closing process of the door (1200), a change distance (Ro) of a contact line in which a line contact is made on the first vertical contact surfaces (1510*a*) and (1510*b*) provided in the first vertical support (1510) is formed to be larger than a change distance (Lo) of a contact line in which a line contact is made on the second vertical contact surfaces (1520*a*) and (1520*b*) provided in the second vertical support (1520).

4. The apparatus according to claim 2, characterized in that, the first vertical contact surfaces (1510*a*) and (1510*b*) provided on the first vertical support (1510) are provided with both the concave contact surface (1510*a*) and the convex contact surface (1510*b*), and the second vertical contact surfaces (1520*a*) and (1520*b*) provided on the second vertical support (1520) are provided with both the convex contact surface (1520*b*) and the concave contact surface (1520*a*) corresponding to the first vertical contact surfaces (1510*a*) and (1510*b*), respectively.

5. The apparatus according to claim 3, characterized in that, the first vertical contact surfaces (1510*a*) and (1510*b*) provided on the first vertical support (1510) are provided with both the concave contact surface (1510*a*) and the convex contact surface (1510*b*), and the second vertical contact surfaces (1520*a*) and (1520*b*) provided on the second vertical support (1520) are provided with both the convex contact surface (1520*b*) and the concave contact surface (1520*a*) corresponding to the first vertical contact surfaces (1510*a*) and (1510*b*), respectively.

6. The apparatus according to claim 4, characterized in that, the concave contact surface (1510*b*) of the first vertical contact surfaces (1510*a*), (1510*b*) provided to the first vertical support (1510) is formed to contact the convex contact surface (1520*b*) of the second vertical contact surfaces (1520*a*) and (1520*b*) provided to the second vertical support (1520) in a door closed state, and in an inflection section passing an inflection point at which a contact portion is changed from the concave contact surface (1510*b*) to the convex contact surface (1510*a*) in the first vertical contact surfaces (1510*a*), (1510*b*) provided to the first vertical support (1510), the inflection section is formed such that contact stress of the line contact portion is reduced due to an increase in a number of contact line as the contact portion is changed.

7. The apparatus according to claim 5, characterized in that, the concave contact surface (1510*b*) of the first vertical contact surfaces (1510*a*), (1510*b*) provided to the first vertical support (1510) is formed to contact the convex contact surface (1520*b*) of the second vertical contact surfaces (1520*a*) and (1520*b*) provided to the second vertical support 1520 in a door closed state, and in an inflection section passing an inflection point at which a contact portion is changed from the concave contact surface (1510*b*) to the convex contact surface (1510*a*) in the first vertical contact surfaces (1510*a*), (1510*b*) provided to the first vertical support (1510), the inflection section is formed such that contact stress of the line contact portion is reduced due to an increase in a number of contact line as the contact portion is changed.

* * * * *